(12) United States Patent
Li et al.

(10) Patent No.: US 12,101,217 B2
(45) Date of Patent: *Sep. 24, 2024

(54) COMMUNICATION METHOD, COMMUNICATIONS APPARATUS, AND COMMUNICATIONS SYSTEM

(71) Applicant: Huawei Technologies Co., Ltd., Shenzhen (CN)

(72) Inventors: Xinxian Li, Shanghai (CN); Hao Tang, Ottawa (CA); Zhenfei Tang, Shanghai (CN); Junchao Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,941

(22) Filed: Jun. 18, 2021

(65) Prior Publication Data
US 2021/0314208 A1 Oct. 7, 2021

Related U.S. Application Data

(63) Continuation of application No. 16/235,539, filed on Dec. 28, 2018, now Pat. No. 11,075,789, which is a
(Continued)

(30) Foreign Application Priority Data

Aug. 11, 2017 (CN) .......................... 201710687875.7
Sep. 29, 2017 (CN) .......................... 201710908898.6

(51) Int. Cl.
H04L 27/26 (2006.01)
H04J 11/00 (2006.01)
(Continued)

(52) U.S. Cl.
CPC ...... *H04L 27/2666* (2013.01); *H04J 11/0086* (2013.01); *H04L 5/00* (2013.01);
(Continued)

(58) Field of Classification Search
CPC . H04L 27/2666; H04L 27/26025; H04L 5/00; H04L 5/0091; H04W 48/12; H04J 11/0086
See application file for complete search history.

(56) References Cited

U.S. PATENT DOCUMENTS

2016/0323870 A1 11/2016 Wei et al.
2018/0124744 A1 5/2018 Xue et al.
(Continued)

FOREIGN PATENT DOCUMENTS

CN 103141070 A 6/2013
CN 104754763 A 7/2015
(Continued)

OTHER PUBLICATIONS

LG Electronics, "Remaining details on wider bandwidth operation", 3GPP TSG RAN WG1 Meeting Ad-Hoc R1-1710352, Jun. 27-30, 2017, 10 pages, Qingdao, P.R. China.
(Continued)

*Primary Examiner* — Rhonda L Murphy
(74) *Attorney, Agent, or Firm* — Slater Matsil, LLP

(57) ABSTRACT

Embodiments of this application provide a communication method, a communications apparatus, and a communications system, to determine a physical resource block (PRB) grid when a center frequency of a synchronization signal (SS) is inconsistent with a center frequency of a carrier. The method includes: receiving, by a terminal, an SS from a network device; determining, by the terminal, a first PRB grid based on the SS; receiving, by the terminal, first indication information from the network device, where the
(Continued)

first indication information is used to indicate a first frequency offset between the first PRB grid and a second PRB grid; and determining, by the terminal, the second PRB grid based on the first PRB grid and the first frequency offset.

11 Claims, 16 Drawing Sheets

Related U.S. Application Data continuation of application No. PCT/CN2018/100072, filed on Aug. 10, 2018.

(51) Int. Cl.
  *H04L 5/00* (2006.01)
  *H04W 48/12* (2009.01)
  *H04W 56/00* (2009.01)

(52) U.S. Cl.
  CPC ...... *H04L 5/0091* (2013.01); *H04L 27/26025* (2021.01); *H04W 48/12* (2013.01); *H04W 56/0035* (2013.01); *H04L 5/0007* (2013.01); *H04L 5/0053* (2013.01)

(56) References Cited

U.S. PATENT DOCUMENTS

| | | | |
|---|---|---|---|
| 2018/0212726 A1* | 7/2018 | Xue | H04L 27/26 |
| 2018/0234971 A1 | 8/2018 | Kato et al. | |
| 2018/0234977 A1 | 8/2018 | Yasukawa et al. | |
| 2019/0021119 A1 | 1/2019 | Ng et al. | |
| 2019/0053061 A1* | 2/2019 | Sui | H04W 72/0446 |

FOREIGN PATENT DOCUMENTS

| | | |
|---|---|---|
| CN | 104977593 A | 10/2015 |
| CN | 106559206 A | 4/2017 |
| CN | 106961734 A | 7/2017 |
| RU | 2608580 C1 | 1/2017 |
| WO | 2017026495 A1 | 2/2017 |
| WO | 2017118778 A1 | 7/2017 |
| WO | 2017121289 A1 | 7/2017 |
| WO | 2017123279 A1 | 7/2017 |
| WO | 2017136003 A1 | 8/2017 |

OTHER PUBLICATIONS

Nokia Networks, "On the channel raster design for NB-IoT", 3GPP TG-RAN WG1 NB-IoT AdHoc R1-160172, Jan. 18-20, 2016, 7 pages, Budapest, Hungary.

Ericsson, "NB-IoT Channel Raster", 3GPP TSG-RAN1 NB-IoT Ad Hoc R1-160082, Jan. 18-20, 2016, 3 pages, Budapest, Hungary.

ITL, "Multiple SS block indication in wideband CC", 3GPP TSG RAN WG1 NR Ad-Hoc#2, Jun. 27-30, 2017, R1-1711352, 5 pages, Qingdao, P.R. China.

3rd Generation Partnership Project; Technical Specification Group Radio Access Network;NR; User Equipment (UE) radio transmission and reception; Part 1: Range 1 Standalone (Release 15), 3GPP TS 38.101-1 V0.0.1 (Aug. 2017), 11 pages.

"Physical channels and modulation," 3GPP TS 38.211, 3rd Generation Partnership Project, Technical Specification Group Radio Access Network, Jun. 2017, 22 pages, Release 15, V0. 1.0.

3rd Generation Partnership Project; Technical Specification Group Radio Access Network; NR; NR and NG-RAN Overall Description; Stage 2 (Release 15), 3GPP TS 38.300 V0.6.0 (Aug. 2017), 58 pages.

"Physical channels and modulation," 3GPP TS 38.331, 3rd Generation Partnership Project, Technical Specification Group Radio Access Network, Radio Resource Control (RRC), Protocol specification, Jun. 2017, 22 pages, Release 15, Vo. 0.4.

Ericsson, "NB-IoT Channel Raster," 3GPP TSG-RAN1 NG-IoT Ad Hoc, R1-160082, Budapest, Hungary, Jan. 18-20, 2016, 4 pages.

Intel Corporation, "Remaining system information delivery mechanisms", 3GPP TSG RAN WG1 Meeting RAN1 #89, R1-1707340, Hangzhou, P.R. China, May 15-19, 2017, 4 pages.

LG Electronics, "Remaining details on wider bandwidth operation", 3GPP TSG RAN WG1 Meeting Ad-Hoc R1-1710352, Qingdao, P.R. China, Jun. 27-30, 2017, 9 pages.

Nokia Networks, "On the channel raster design for NB-IoT," 3GPP DTSG-RAN WG1 NB-IoT, R1-160172, Budapest, Hungary, Jan. 18-20, 2016, 8 pages.

NTT DOCOMO, Inc., "Discussion on remaining minimum system information delivery for NR", 3GPP TSG RAN WG1 NR Ad-Hoc#2, R1-1711063, Qingdao, P.R. China, Jun. 27-30, 2017, 4 pages.

Panasonic, "Discussion on frequency domain frame structure for NR," 3GPP TSG RAN WG1 Meeting #86bis, R1-1609815, Lisbon, Portugal, Oct. 10-14, 2016, 6 pages.

Panasonic, "Discussion on PRB grid and PRB indexing," 3GPP TSG RAN WG1 NR Ad-Hoc#2, R1-1710943, Qingdao, P.R. China, Jun. 27-30, 2017, 5 pages.

* cited by examiner

SS block

COMMUNICATION METHOD, COMMUNICATIONS APPARATUS, AND COMMUNICATIONS SYSTEM

CROSS-REFERENCE TO RELATED APPLICATIONS

This application is a continuation of U.S. patent application Ser. No. 16/235,539, filed on Dec. 28, 2018, which is a continuation of International Application No. PCT/CN2018/100072, filed on Aug. 10, 2018, which claims priority to Chinese Patent Application No. 201710687875.7, filed on Aug. 11, 2017, and Chinese Patent Application No. 201710908898.6, filed on Sep. 29, 2017. All of the aforementioned patent applications are hereby incorporated by reference in their entireties.

TECHNICAL FIELD

Embodiments of this application relate to the field of communications technologies, and in particular, to a communication method, a communications apparatus, and a communications system.

BACKGROUND

In a wireless communications technology, after a terminal is powered on, the terminal accesses a wireless network after undergoing processes of cell search, system information reception, and random access, to be served by the wireless network. During the cell search process, the terminal detects a synchronization signal (SS), determines, based on the SS, a cell on which the terminal camps, and achieves downlink synchronization with the cell.

The terminal detects the SS at a granularity of a channel raster. The channel raster is 100 kHz for all bands. In other words, a center frequency of a carrier is an integral multiple of 100 kHz. The SS includes a primary synchronization signal (PSS) and a secondary synchronization signal (SSS). In frequency domain, the PSS and the SSS are mapped to six physical resource blocks (PRB) in the middle of the carrier (namely, entire system bandwidth), namely, 72 subcarriers in the middle of the carrier. Because the terminal does not yet achieve downlink synchronization with the cell in this case, to prevent interference, the PSS and the SSS are actually mapped to 62 subcarriers in the middle of the carrier, and five subcarriers on each side of the 62 subcarriers play a protection function. It can be learned that the SS is located at a center of the carrier. In other words, a center frequency of the SS is consistent with (or the same as) the center frequency of the carrier. Therefore, after detecting the SS, the terminal can learn the center frequency of the carrier.

After the cell search, the terminal achieves downlink synchronization with the cell, and can receive downlink information that is sent by a network device through the cell. For example, the network device broadcasts bandwidth (or referred to as system bandwidth) information of the carrier on a physical broadcast channel (PBCH). The terminal receives the bandwidth information of the carrier, and determines carrier bandwidth based on the bandwidth information of the carrier. In this way, the terminal can obtain the center frequency of the carrier after detecting the SS, obtain the carrier bandwidth after searching the PBCH, and then determine a grid of a physical resource block (PRB) of the carrier based on the center frequency of the carrier and the carrier bandwidth.

With development of communications technologies, the center frequency of the SS is no longer consistent with the center frequency of the carrier. The following problem may be caused if an existing manner of determining a PRB grid is used: Resources are misinterpreted and data cannot be correctly received or transmitted, causing communication quality degradation.

SUMMARY

Embodiments of this application provide a communication method, a communications apparatus, and a communications system, to determine a physical resource block (PRB) grid when a center frequency of a synchronization signal (SS) is inconsistent with a center frequency of a carrier, so as to correctly receive or send data.

According to a first aspect, a communication method is provided. The method includes receiving, by a terminal, an SS from a network device. The method also includes determining, by the terminal, a first PRB grid based on the SS. The method also includes receiving, by the terminal, first indication information from the network device, where the first indication information is used to indicate a first frequency offset between the first PRB grid and a second PRB grid. The method also includes determining, by the terminal, the second PRB grid based on the first PRB grid and the first frequency offset.

According to a second aspect, a communication method is provided. The method includes sending, by a network device, an SS to a terminal based on a first PRB grid. The method also includes sending, by the network device, first indication information to the terminal, where the first indication information is used to indicate a first frequency offset between the first PRB grid and a second PRB grid. The method also includes performing, by the network device, information transmission with the terminal based on the second PRB grid.

According to a third aspect, a communications apparatus is provided, where the communications apparatus is applied to a terminal, and includes units or means configured to perform steps in the first aspect.

According to a fourth aspect, a communications apparatus is provided, where the communications apparatus is applied to a network device, and includes units or means configured to perform steps in the second aspect.

According to a fifth aspect, a communications apparatus is provided, including at least one processing element and at least one storage element. The at least one storage element is configured to store a program and data. When the apparatus is applied to a terminal, the at least one processing element is configured to perform the method provided in the first aspect of this application. When the apparatus is applied to a network device, the at least one processing element is configured to perform the method provided in the second aspect of this application.

According to a sixth aspect, a communications apparatus is provided, including at least one processing element (or chip) configured to perform the method according to the first aspect or the second aspect.

According to a seventh aspect, a program is provided, where when being executed by a processor, the method according to the first aspect or the second aspect is performed.

According to an eighth aspect, a program product, for example a computer readable storage medium, is provided, including the program according to the seventh aspect.

According to the foregoing aspects, the network device indicates, to the terminal, a frequency offset between a PRB grid corresponding to an SS and a PRB grid corresponding to a data/control channel, so that when detecting the SS, the terminal may determine, based on the PRB grid corresponding to the SS and the frequency offset, the PRB grid corresponding to the data/control channel. In this way, data/control information can be correctly transmitted and received on the data/control channel.

In an implementation, a subcarrier spacing of the second PRB grid is the same as a subcarrier spacing of the SS.

In an implementation, the network device sends first indication information through a physical broadcast channel (PBCH), and the terminal receives the first indication information through the PBCH.

In an implementation, the first indication information is used to indicate a frequency offset value, where an offset direction of the first PRB grid relative to the second PRB grid is predefined, or is indicated by using second indication information; or the first indication information is used to indicate a frequency offset value, and an offset direction of the first PRB grid relative to the second PRB grid.

In an implementation, there may be a plurality of subcarrier spacings, on a carrier, for data/control channel transmission. To determine PRB grids corresponding to different subcarrier spacings, the foregoing method may further include: sending, by the network device, third indication information to the terminal, where the third indication information is used to indicate a second frequency offset between the second PRB grid and a third PRB grid, and a subcarrier spacing of the third PRB grid is greater than a subcarrier spacing of the SS; and receiving, by the terminal, the third indication information, and determining the third PRB grid based on the second PRB grid and the second frequency offset.

In an implementation, the network device sends the third indication information through the PBCH, or sends the third indication information by using remaining minimum system information RMSI; or sends the third indication information by using a radio resource control (RRC) message. Correspondingly, the terminal receives the third indication information through the PBCH, the RMSI, or the RRC message.

In this way, if the carrier supports a plurality of subcarrier spacings, when detecting the SS, the terminal may determine, based on the SS, a PRB grid used for the SS. When the subcarrier spacing of the SS is the same as a subcarrier spacing of the data/control information, the network device may determine, based on the first indication information, a PRB grid used for the data/control information; or when the subcarrier spacing of the SS is different from a subcarrier spacing of the data/control information, the terminal may determine, based on the second indication information and a PRB grid corresponding to a subcarrier spacing that is the same as the subcarrier spacing of the SS, a PRB grid used for the data/control information. Therefore, data/control information can be correctly transmitted on a carrier that supports a plurality of subcarrier spacings.

DETAILED DESCRIPTION OF ILLUSTRATIVE EMBODIMENTS

Figure 1:
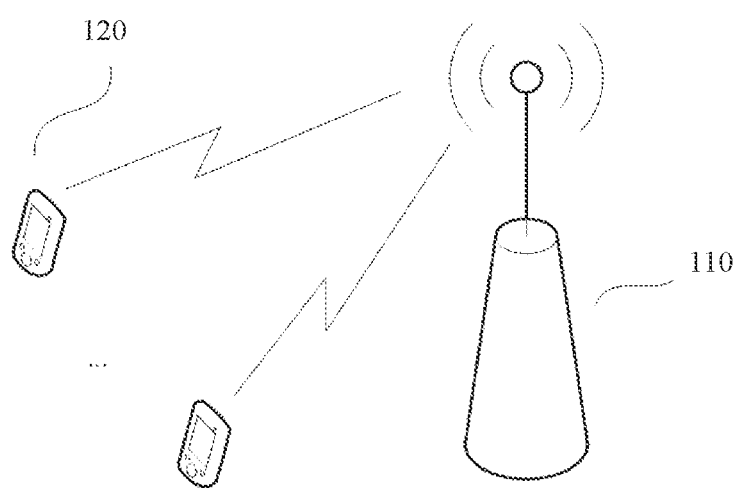
FIG. 1 is a schematic diagram of a communications system according to an embodiment of this application.

For ease of understanding by a person skilled in the art, the following describes some terms in the embodiments of this application.

(1) A terminal, also referred to as user equipment (UE), a mobile station (MS), a mobile terminal (MT), or the like, is a device that provides voice/data connectivity for a user, for example, a handheld device or an in-vehicle device having a wireless connection function. Currently, some examples of the terminal are: a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, and the like.

(2) A network device is a device that provides a wireless service for a terminal, and includes, for example, a radio access network (RAN) node (or device). A RAN node (or device) is a node (or device), in a network, to connect a terminal to a wireless network. Currently, some examples of the RAN node are: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a Wi-Fi access point (AP). In addition, in a network structure, a RAN includes a centralized unit (CU) node or a distributed unit (DU) node. In this structure, functional division on a RAN side is implemented in the CU and the DU, and a plurality of DUs are centrally controlled by one CU. In this case, the RAN node may be a CU node/a DU node. Functions of the CU and the DU may be divided based on protocol layers of a wireless network. For example, functions of a Packet Data Convergence Protocol (PDCP) layer are arranged in the CU, and functions of protocol layers below the PDCP layer, for example, a Radio Link Control (RLC) layer and a Media Access Control (MAC) layer, are arranged in the DU. The division based on protocol layers is only an example, and there may be other division based on protocol layers, for example, division at the RLC layer, where functions of the RLC layer and a protocol layer above the RLC layer are arranged in the CU, and functions of a protocol layer below the RLC layer are arranged in the DU; or, division in a particular protocol layer, for example, some functions of the RLC layer and functions of a protocol layer above the RLC layer are arranged in the CU, and remaining functions of the RLC layer and functions of a protocol layer below the RLC layer are arranged in the DU. In addition, there may be division in another manner, for example, division based on a delay, to arrange a function that needs to meet a delay requirement in the DU, and arrange a function that is lower than the delay requirement in the CU.

(3) "A plurality of" means two or more, and other quantifiers are similar. The character "/" describes an association relationship for describing associated objects and represents that three relationships may exist. For example, A/B may represent the following three cases: Only A exists, both A and B exist, and only B exists.

FIG. 1 is a schematic diagram of a communications system according to an embodiment of this application. As shown in FIG. 1, a terminal 120 accesses a wireless network through a network device 110, to be served by an external network (for example, the Internet) through the wireless network or communicate with another terminal through the wireless network. After the terminal 120 is powered on, the terminal initially accesses the wireless network to be served by the wireless network and to transmit and receive data.

Figure 2:
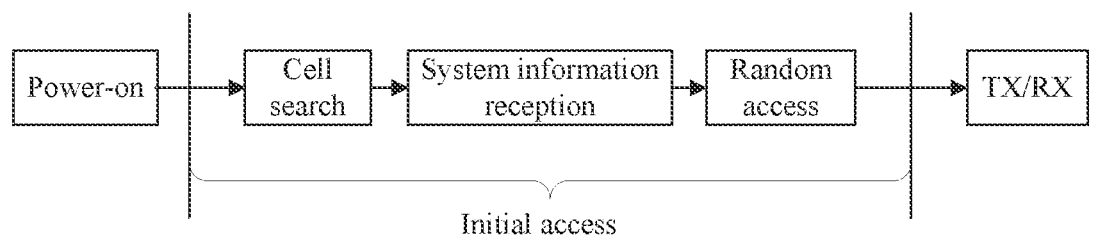
FIG. 2 is a schematic diagram of initially accessing a wireless network by a terminal according to an embodiment of this application.

The following is described with reference to FIG. 2. FIG. 2 is a schematic diagram of initially accessing a wireless network by a terminal according to an embodiment of this application. After the terminal is powered on, the terminal initially accesses the wireless network after undergoing processes of cell search, system information reception, random access, and the like, and then can perform data transmission (TX) and reception (RX).

During the cell search, the terminal detects a synchronization signal (SS), determines, based on the SS, a cell on which the terminal camps, and achieves downlink synchronization with the cell. In a Long Term Evolution (LTE) communications system, the terminal detects the SS at a granularity of a channel raster. The channel raster is 100 kHz for all bands. In other words, a center frequency of a carrier is an integral multiple of 100 kHz. The SS includes a primary synchronization signal (PSS) and a secondary synchronization signal (SSS). In frequency domain, the PSS and the SSS are mapped to six physical resource blocks (PRB) in the middle of the carrier (namely, entire system bandwidth), namely, 72 subcarriers in the middle of the carrier. Because the terminal does not yet achieve downlink synchronization with the cell in this case, to prevent interference, the PSS and the SSS are actually mapped to 62 subcarriers in the middle of the carrier, and five subcarriers on each side of the 62 subcarriers play a protection function. It can be learned that the SS is located at a center of the carrier. In other words, a center frequency of the SS is consistent with (or the same as) the center frequency of the carrier. Therefore, after detecting the SS, the terminal can learn the center frequency of the carrier. After the cell search, the terminal achieves downlink synchronization with the cell, and can receive downlink information that is sent by a network device through the cell. For example, the network device broadcasts bandwidth (or referred to as system bandwidth) information of the carrier on a physical broadcast channel (PBCH). The terminal receives the bandwidth information of the carrier, and determines carrier bandwidth based on the bandwidth information of the carrier. In this way, the terminal can obtain the center frequency of the carrier after detecting the SS, obtain the carrier bandwidth after searching the PBCH, and then determine a grid of a physical resource block (PRB) of the carrier based on the center frequency of the carrier and the carrier bandwidth.

Figure 3:
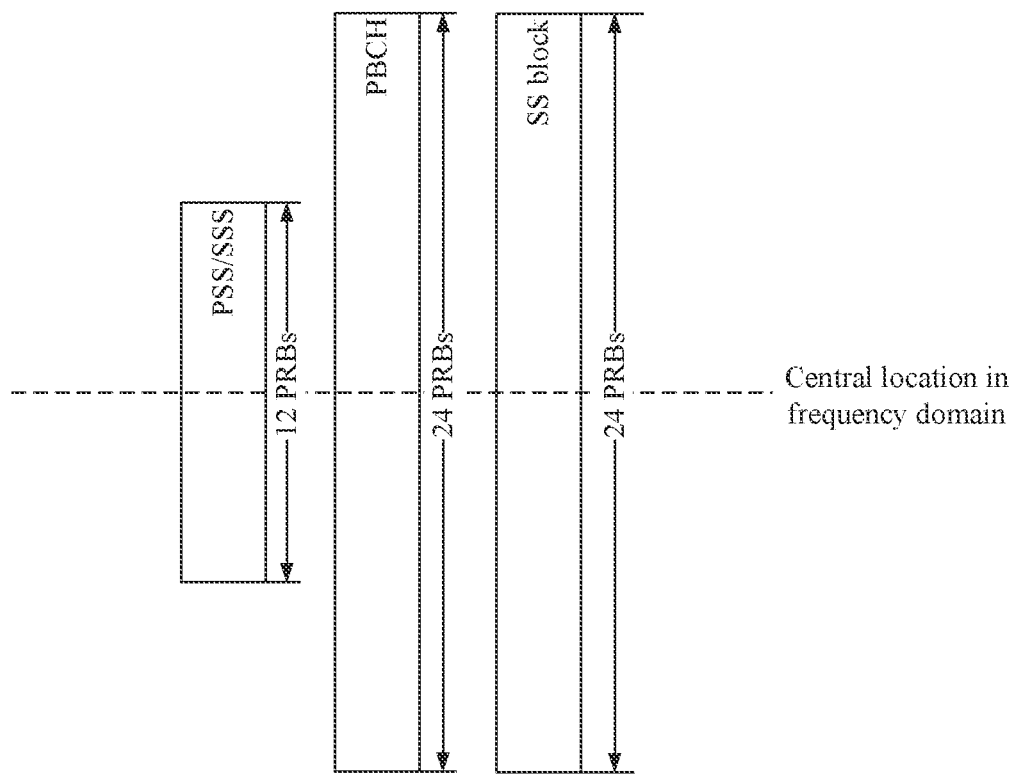
FIG. 3 is a frequency domain schematic diagram of an SS, a PBCH, and an SS block in which the SS and the PBCH are located according to an embodiment of this application.

In a fifth generation (5G) mobile communications system, also referred to as a new radio (NR) communications system, a terminal initially accesses a wireless network also after undergoing processes of cell search, system information reception, random access, and the like. In the NR communications system, a concept of a synchronization signal block (SS block) is introduced. The SS block includes an SS and a physical broadcast channel (PBCH), where the SS includes a PSS and an SSS. FIG. 3 is a frequency domain schematic diagram of an SS, a PBCH, and an SS block in which the SS and the PBCH are located according to an embodiment of this application. As shown in FIG. 3, the SS block occupies 24 PRBs in frequency domain, namely, 288 subcarriers. Central locations of the SS and the PBCH in frequency domain are a central location of the SS block in frequency domain. In other words, center frequencies of the SS and PBCH are aligned with or consistent with a center frequency of the SS block. The SS occupies 12 PRBs, namely, 144 subcarriers; and the PBCH occupies 24 PRBs, namely, 288 subcarriers. In other words, the SS is mapped to 12 PRBs, and the PBCH is mapped to 24 PRBs.

Figure 4:
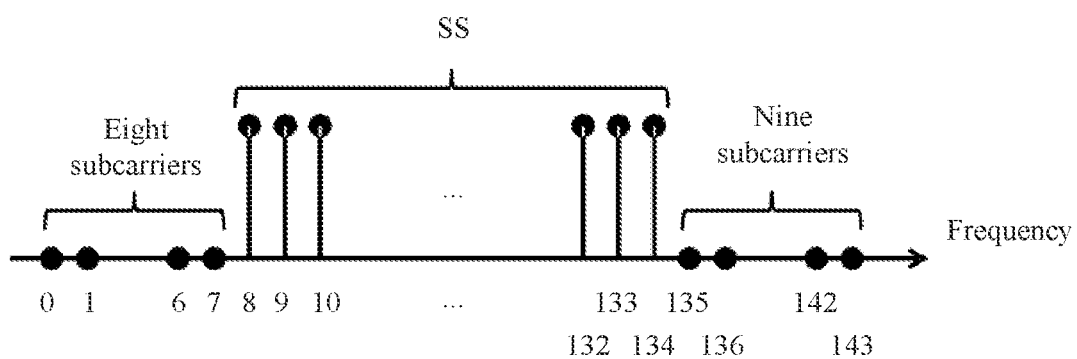
FIG. 4 is a frequency domain schematic diagram of an SS according to an embodiment of this application.

FIG. 4 is a frequency domain schematic diagram of an SS according to an embodiment of this application. As shown in FIG. 4, the SS is mapped to a 7th PRB to an 18th PRB of an SS block, and the 12 PRBs include 144 subcarriers numbered from 0 to 143, where an SS sequence is mapped to subcarriers numbered from 8 to 134. No data is mapped to first eight subcarriers and last nine subcarriers, so as to play a protection function.

A network device sends the SS block based on an SS raster. In other words, the SS can be sent only at a location of the SS raster, and information is sent on a PBCH. A terminal blindly detects the SS based on the SS raster, that is, detects the SS at the location of the SS raster. After detecting the SS, the terminal can learn of a center frequency of the SS, and then receives the information on the PBCH on 24 PRBs that center on the center frequency of the SS. The SS raster is a raster formed at a possible location of the SS in frequency domain. When the SS is sent at a location of the SS raster, the center frequency of the SS is at this location. Subsequently, when the network device 110 periodically sends the SS in time domain, the location of the SS in frequency domain does not change. When detecting the SS, the terminal may determine, based on the center frequency of the SS and a subcarrier spacing of the SS, a PRB grid corresponding to the SS, where the subcarrier spacing of the SS is a subcarrier spacing used for SS transmission/reception. However, a PRB grid that is used when the network device transmits data/control information centers on a center frequency of a carrier, and a size of the PRB grid is determined based on a subcarrier spacing of the data/control information, where the subcarrier spacing of the data/control information is a subcarrier spacing used for data/control information transmission/reception. If the terminal still performs the data/control information transmission/reception based on the PRB grid corresponding to the SS, because the PRB grid corresponding to the SS is probably inconsistent with the PRB grid used by the network device, a PRB resource is misinterpreted, and data cannot be correctly transmitted or received.

Figure 5:
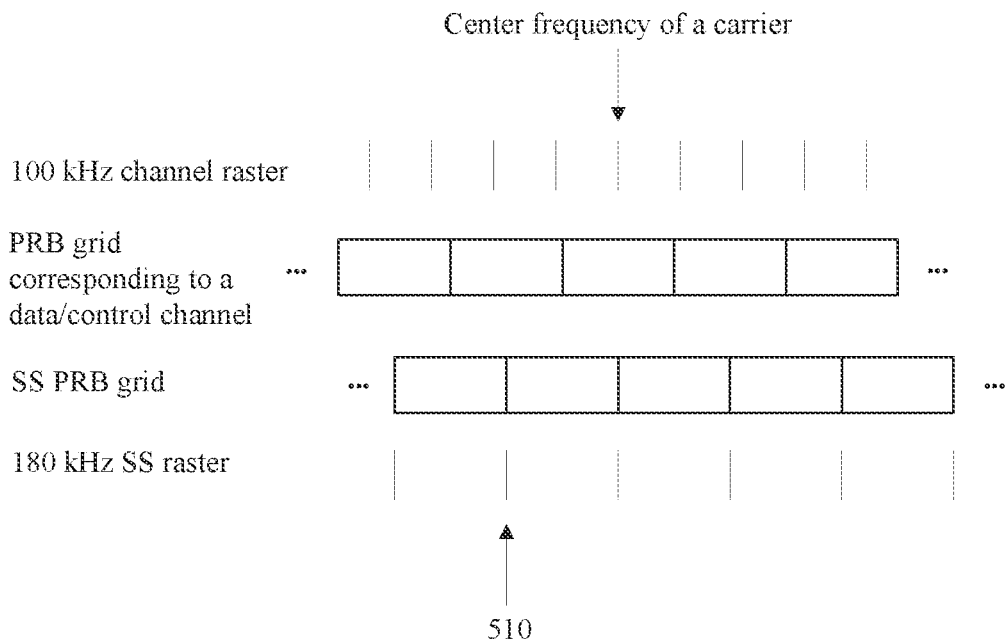
FIG. 5 is a schematic diagram of an SS raster and a PRB grid according to an embodiment of this application.

The foregoing problem is described below with reference to FIG. 5 by using an example in which a channel raster is 100 kHz, an SS raster is 180 kHz, and a subcarrier spacing of an SS is 15 kHz. FIG. 5 is a schematic diagram of an SS raster and a PRB grid according to an embodiment of this application. A distance between two adjacent vertical lines at a lower part of FIG. 5 represents a size of the SS raster, namely, 180 kHz; and a distance between two adjacent vertical lines at an upper part of FIG. 5 represents a size of a channel raster, namely, 100 kHz. Two middle PRB grids are respectively a PRB grid corresponding to a data/control channel on a carrier and a PRB grid corresponding to an SS. Herein, assuming that a subcarrier spacing of the data/control channel on the carrier is the same as a subcarrier spacing of the SS, sizes of the PRBs are the same. Assuming that a network device sends the SS at a location 510, the terminal performs blind detection based on the SS raster, and detects the SS at the location 510. It is assumed that the location 510 is 180*N kHz, where N is a non-negative integer. A center frequency of the carrier is located at a center of the carrier, and is an integral multiple of the channel raster. When a quantity of PRBs of the carrier is an even number, the center frequency of the carrier is located between two PRBs, namely, at an intersection of the two PRBs. When the quantity of PRBs of the carrier is an odd number, the center frequency of the carrier is located at a center of an intermediate PRB. Assuming that the center frequency of the carrier is 100*M kHz, an offset value between the center frequency of the carrier and the location 510 is |180*N kHz−100*M kHz|, where "||" indicates acquisition of an absolute value. If the subcarrier spacing of the SS is 15 kHz, a size of a PRB corresponding to the SS is 15*12 kHz, namely, 180 kHz; and a size of a PRB corresponding to the data/control channel is also 180 kHz. In this case, the PRB grid corresponding to the SS may not be aligned with the PRB grid corresponding to the data/control channel. If the terminal receives or transmits data based on the PRB grid corresponding to the SS, there may be a problem that a resource is misinterpreted and data cannot be correctly received or transmitted, causing communication quality degradation.

In consideration of the foregoing problem, the following embodiments provide several solutions, so as to address an issue in determining a PRB grid.

In a solution, the network device indicates, to the terminal, a frequency offset between the PRB grid corresponding to the SS and the PRB grid corresponding to the data/control channel. Therefore, when detecting the SS, the terminal can determine, based on the PRB grid corresponding to the SS and the frequency offset, the PRB grid corresponding to the data/control channel. In this way, data/control information can be correctly transmitted and received on the data/control channel. In this solution, it is assumed that the PRB corresponding to the SS and the PRB corresponding to the data/control channel have a same subcarrier spacing.

There may be a plurality of subcarrier spacings, on a carrier, for data/control channel transmission. When a subcarrier spacing used for data/control channel transmission is the same as the subcarrier spacing of the SS, it is assumed that a PRB grid used for the carrier in this case is a PRB grid $G_1$; or when a subcarrier spacing for data/control channel transmission is different from the subcarrier spacing of the SS, it is assumed that a PRB grid used for the carrier in this case is a PRB grid $G_2$. The PRB grid $G_1$ may be obtained by using the foregoing solution, to transmit and receive data/control information on the data/control channel. When the subcarrier spacing used for the data/control channel transmission is greater than the subcarrier spacing of the SS, the network device may indicate, to the terminal, a frequency offset between the PRB grid $G_2$ and the PRB grid $G_1$. Therefore, the terminal can obtain the PRB grid $G_1$ by using the foregoing method, and then obtain the PRB grid $G_2$, to transmit and receive data/control information on the data/control channel. Alternatively, the network device may indicate, to the terminal, a frequency offset between a boundary of the PRB grid $G_2$ and the center frequency of the SS. Therefore, the terminal can determine the PRB grid $G_2$ based on the center frequency of the SS and the frequency offset, to transmit and receive data/control information on the data/control channel. When the subcarrier spacing used for the data/control channel transmission is smaller than the subcarrier spacing of the SS, because there is a nesting relationship between PRB grids corresponding to different subcarrier spacings, the PRB grid $G_2$ may be directly obtained based on the PRB grid $G_1$ and the subcarrier spacing used for the data/control channel transmission, to transmit and receive data/control information on the data/control channel.

In the embodiments of this application, frequency offsets are absolute values, where a frequency offset between A and B may be an absolute value of a frequency offset of A relative to B, or may be an absolute value of a frequency offset of B relative to A. In addition, in the embodiments of this application, a PRB grid may be understood as a PRB grid structure.

The following is described with reference to the accompanying drawings.

Figure 6:
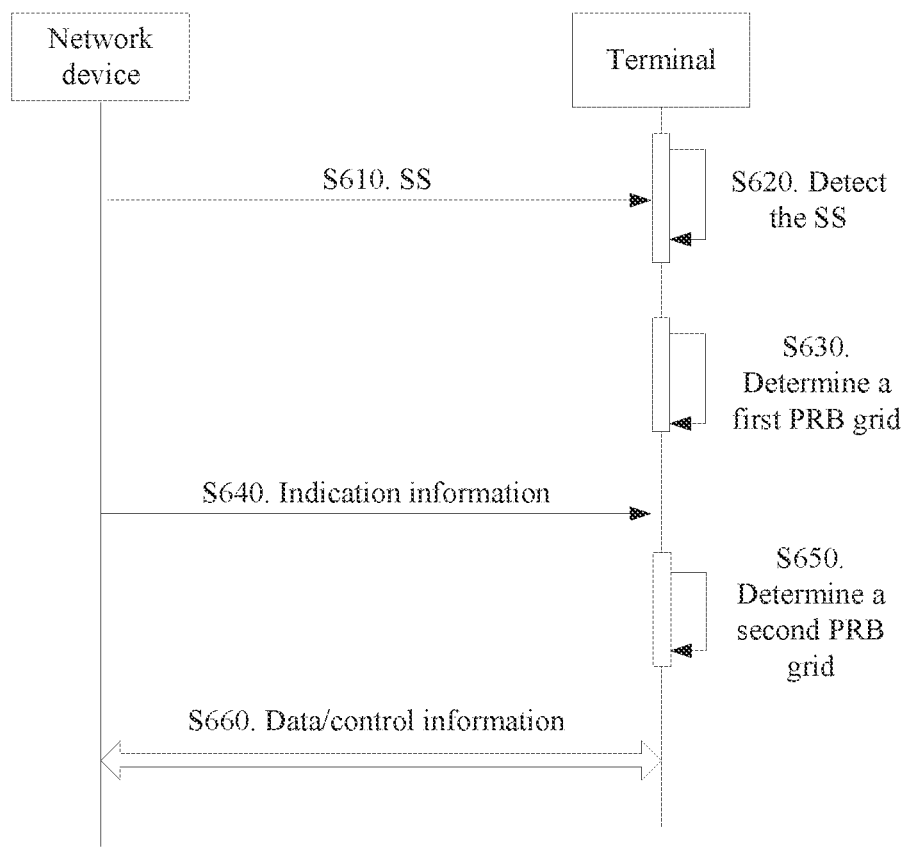
FIG. 6 is a schematic diagram of a communication method according to an embodiment of this application.

FIG. 6 is a schematic diagram of a communication method according to an embodiment of this application. As shown in FIG. 6, the method includes the following steps:

S610. A network device sends an SS to a terminal.

S620. The terminal detects the SS.

S630. When the SS is detected, the terminal determines a first PRB grid (a PRB grid $G_0$) based on the SS. In other words, when receiving the SS from the network device, the terminal determines the first PRB grid (the PRB grid $G_0$) based on the SS.

S640. The network device sends indication information $I_1$ to the terminal, where the indication information $I_1$ is used to indicate a frequency offset $F_1$ between the first PRB grid (the PRB grid $G_0$) and a second PRB grid (a PRB grid $G_1$).

S650. The terminal determines the second PRB grid (the PRB grid $G_1$) based on the first PRB grid (the PRB grid $G_0$) and the frequency offset $F_1$.

After the second PRB grid (the PRB grid $G_1$) is determined, if the network device performs data/control information transmission on a carrier by using a subcarrier spacing that corresponds to the second PRB grid (the PRB grid $G_1$), or the network device allocates a resource to the terminal based on the second PRB grid (the PRB grid $G_1$), the data/control information transmission may be performed between the terminal and the network device based on the second PRB grid (the PRB grid $G_1$) (in S660).

The first PRB grid (the PRB grid $G_0$) may be referred to as a PRB grid (a PRB grid $G_0$) used for an SS (or an SS block), and the second PRB grid may be referred to as a PRB grid (a PRB grid $G_1$) used for a carrier. The first PRB grid is a PRB grid corresponding to a subcarrier spacing of the SS (or the SS block) in frequency domain. The second PRB grid may be a PRB grid corresponding to a subcarrier spacing of physical channel information/a physical signal on the carrier in frequency domain. The physical channel herein is a physical channel other than a PBCH. For example, the physical channel includes at least one of an uplink/downlink control channel, an uplink/downlink shared channel (also referred to as a data channel), and a random access channel. The physical channel information is information carried on the physical channel. The physical signal is a physical signal other than an SS. For example, the physical signal includes a reference signal. In the foregoing description, a data/control channel is used as an example, and a random access channel or a physical signal is similar thereto.

In the foregoing step S610, the network device sends the SS at a location of an SS raster, and a center frequency of the SS is located at the location. However, the terminal does not know the location at which the network device sends the SS. Therefore, in the foregoing step S620, the terminal performs blind detection based on the SS raster. When the SS is detected at a first location of the SS raster, it may be determined that the location at which the network device sends the SS is the first location, namely, the center frequency of the SS. In addition, the network device can simultaneously broadcast information on a PBCH in S610. When detecting the SS in S620, the terminal may determine the center frequency of the SS, and may also determine a center frequency of the PBCH that is consistent with the center frequency of the SS; and then may determine a frequency domain location of the PBCH, thereby receiving, on the PBCH, the information broadcast by the network device.

In the foregoing step S630, the terminal determines the first PRB grid based on the first location of the SS raster (namely, the center frequency of the SS) and the subcarrier spacing of the SS. A boundary of the first PRB grid is located at the first location, and a size of a PRB in the first PRB grid is a product of the subcarrier spacing of the SS and a quantity (for example, 12) of subcarriers in the PRB. For example, as shown in FIG. 5, when the terminal detects the SS at a location 510, a boundary of the first PRB grid is located at the location 510. If a size of the subcarrier spacing of the SS is 15 kHz, the size of the PRB is 180 kHz. In this way, a PRB grid at a lower part of FIG. 5, namely, the first PRB grid, may be obtained.

In the foregoing step S640, the network device may send the indication information $I_1$ to the terminal through the PBCH. For example, the network device broadcasts a master information block (MIB) on the PBCH, where the MIB carries the indication information $I_1$. The terminal determines the frequency domain location of the PBCH, where the center frequency of the PBCH is the center frequency of the SS, and the PBCH is mapped to 24 PRBs on two sides of the center frequency; and receives, on the PBCH, the indication information $I_1$ broadcast by the network device. The indication information $I_1$ may be the frequency offset $F_1$, or may be indication information of the frequency offset $F_1$. For example, the indication information $I_1$ may be 1-bit information. When the indication information $I_1$ is "0", it indicates that the frequency offset $F_1$ is 0 In other words, there is no frequency offset. The first PRB grid is aligned with the second PRB grid. In this case, when the first PRB grid is determined, the second PRB grid is determined. For another example, when the indication information $I_1$ is "1", it indicates that the frequency offset $F_1$ is half a PRB. In this case, in step S650, the first PRB grid may be offset by half a PRB to obtain the second PRB grid.

In the foregoing step S650, the terminal moves the first PRB grid in frequency domain based on the frequency offset $F_1$ that is indicated in the indication information $I_1$, to obtain the second PRB grid.

When the second PRB grid is obtained, data/control information transmission, including uplink transmission/downlink transmission, may be performed between the terminal and the network device based on the subcarrier spacing that corresponds to the second PRB grid. In this case, a boundary of a PRB is aligned with the second PRB grid. That is, the network device may determine, based on the second PRB grid, a frequency domain location of a PRB of the subcarrier spacing that corresponds to the second PRB grid, thereby allocating a resource to the terminal. The terminal receives data/control information on the allocated resource, or transmits data/control information on the allocated resource. In this case, the network device and the terminal have a consistent understanding of the PRB grids, thereby ensuring correct interpretation of the resource and correct transmission and reception of the data/control information.

A PRB boundary of the first PRB grid is aligned with the center frequency of the SS. When a quantity of PRBs in the carrier is an even number, a PRB boundary of the second PRB grid is aligned with a center frequency of the carrier. If the SS raster is an integral multiple of a channel raster, in this case, the first PRB grid is aligned with the second PRB grid. When a quantity of PRBs in the carrier is an odd number, the center frequency of the carrier is aligned with a center of one PRB in the second PRB grid. In this case, if an offset between the center frequency of the carrier and the center frequency of the SS is an integral multiple of half a PRB, the first PRB grid is aligned with the second PRB grid.

Several cases are separately described below.

Case 1: It is assumed that a size of the SS raster is 360 kHz, a size of the channel raster is 180 kHz, and the subcarrier spacing of the SS is 30 kHz.

A location of the center frequency of the SS is 360*n kHz, a location of the center frequency of the carrier is 180*m kHz, and a size of a PRB corresponding to the subcarrier spacing of 30 kHz is 360 kHz. A frequency offset between the center frequency of the carrier and the center frequency of the SS is |360*n−180*m| kHz, namely, 180*|2n−m| kHz. It is assumed that |2n−m|=k. Then, the frequency offset between the center frequency of the carrier and the center frequency of the SS is 180*k kHz, where m, n, and k are all non-negative integers, and "||" represents acquisition of an absolute value.

Figure 7:
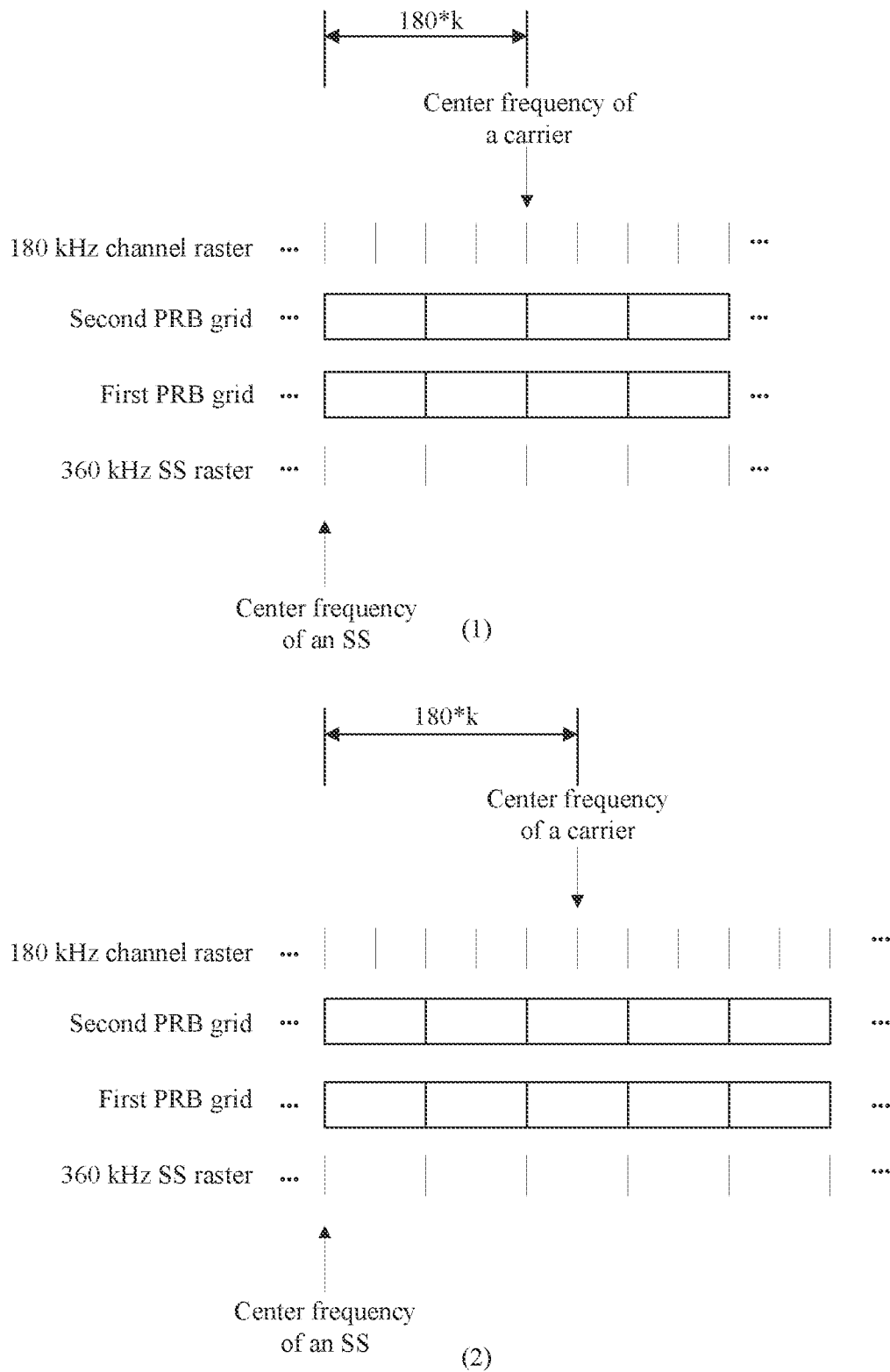
FIG. 7 is a schematic diagram of a first PRB grid and a second PRB grid in a case according to an embodiment of this application.

Refer to FIG. 7 (1). When a quantity of PRBs at the subcarrier spacing of 30 kHz in the carrier is an even number, the center frequency of the carrier is at a boundary of the second PRB grid. In this case, m is an even number, and |2n−m| is an even number. In other words, k is an even number. The frequency offset between the center frequency of the carrier and the center frequency of the SS is 180*k kHz, which is an integral multiple of the PRB size (360 kHz). In this case, the first PRB grid is aligned with the second PRB grid.

Refer to FIG. 7 (2). When the quantity of PRBs at the subcarrier spacing of 30 kHz in the carrier is an odd number, the center frequency of the carrier is at a center of the second PRB grid, namely, at a center of an intermediate PRB. In this case, m is an odd number, and |2n−m| is an odd number. In other words, k is an odd number. The frequency offset between the center frequency of the carrier and the center frequency of the SS is 180*k kHz that is an integral multiple of the PRB size (360 kHz) plus a remainder of ½ PRB, namely, half the PRB size. In this case, the first PRB grid is aligned with the second PRB grid.

Therefore, regardless of whether the quantity of PRBs at the subcarrier spacing of 30 kHz in the carrier is an odd number or an even number, the first PRB grid can be aligned with the second PRB grid. Therefore, the indication information $I_1$ in this case may indicate that the frequency offset $F_1$ is 0 For example, when the indication information $I_1$ is "0", it indicates that the frequency offset $F_1$ is 0.

Case 2: It is assumed that a size of the SS raster is 360 kHz, a size of the channel raster is 180 kHz, and the subcarrier spacing of the SS is 15 kHz.

A location of the center frequency of the SS is 360*n kHz, a location of the center frequency of the carrier is 180*m kHz, and a size of a PRB corresponding to the subcarrier spacing of 15 kHz is 180 kHz. A frequency offset between the center frequency of the carrier and the center frequency of the SS is |360*n−180*m| kHz, namely, 180*|2n−m| kHz. It is assumed that |2n−m|=k. Then, the frequency offset between the center frequency of the carrier and the center frequency of the SS is 180*k kHz, where m, n, and k are all non-negative integers, and "||" represents acquisition of an absolute value.

Figure 8:
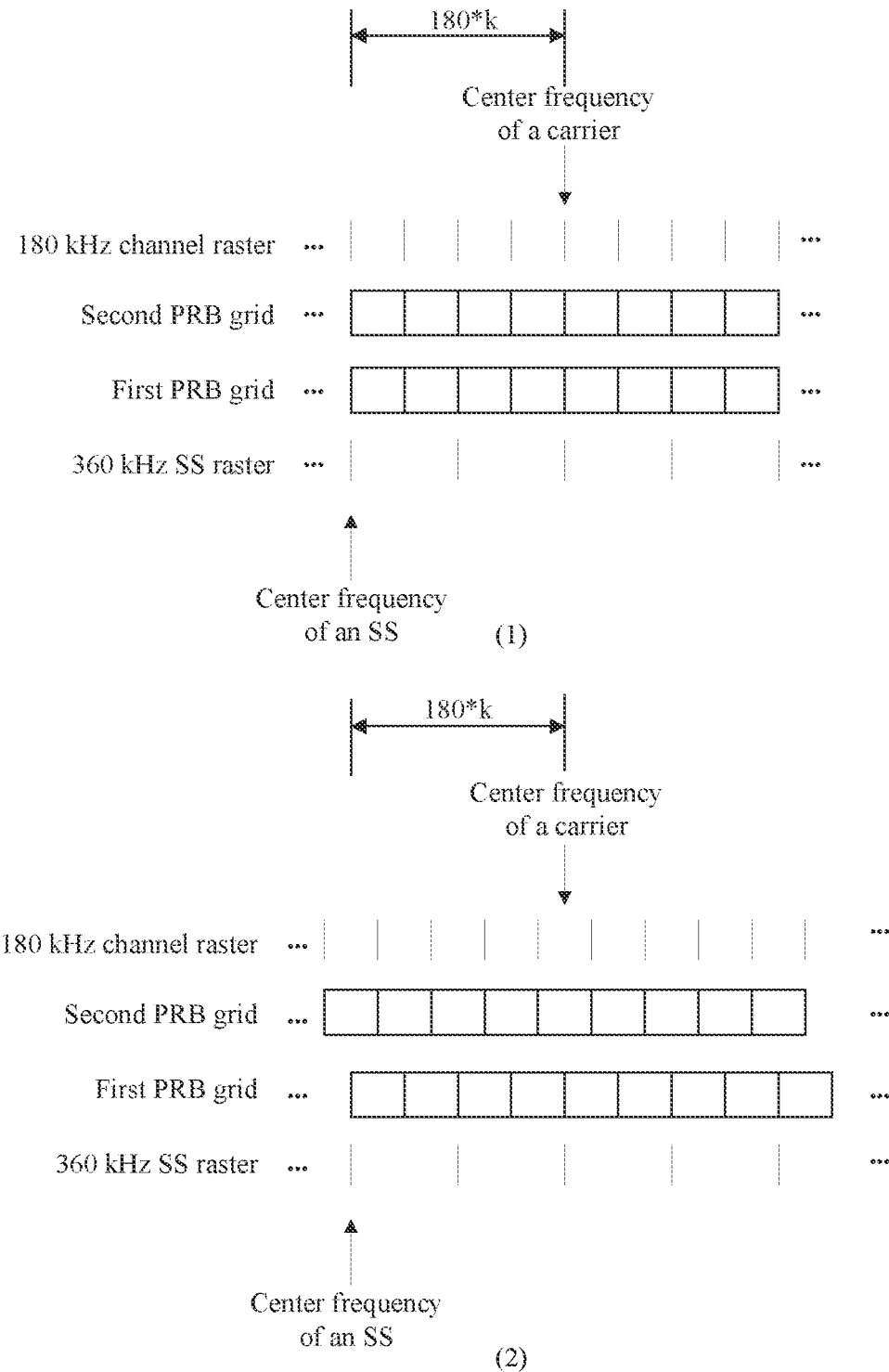
FIG. 8 is a schematic diagram of a first PRB grid and a second PRB grid in another case according to an embodiment of this application.

Refer to FIG. 8 (1). When a quantity of PRBs at the subcarrier spacing of 15 kHz in the carrier is an even number, the center frequency of the carrier is at a boundary of the second PRB grid. In this case, m is an even number, and |2n−m| is an even number. In other words, k is an even number. The frequency offset between the center frequency of the carrier and the center frequency of the SS is 180*k kHz that is an integral multiple of the PRB size (180 kHz). In this case, the first PRB grid is aligned with the second PRB grid.

Refer to FIG. 8 (2). When the quantity of PRBs at the subcarrier spacing of 15 kHz in the carrier is an odd number, the center frequency of the carrier is at a center of the second PRB grid, namely, at a center of an intermediate PRB. In this case, m is an odd number, and |2n−m| is an odd number. In other words, k is an odd number. The frequency offset between the center frequency of the carrier and the center frequency of the SS is 180*k kHz that is an integral multiple of the PRB size (180 kHz). In this case, the first PRB grid and the second PRB grid are not aligned with each other, and an offset of half a PRB exists there between.

In this case, 1-bit indication information $I_1$ may be used to indicate the frequency offset $F_1$ between the first PRB grid and the second PRB grid. When the indication information is "0", it indicates that the frequency offset $F_1$ between the first PRB grid and the second PRB grid is 0 In other words, the first PRB grid is aligned with the second PRB grid. When the indication information is "1", it indicates that the frequency offset $F_1$ between the first PRB grid and the second PRB grid is half a PRB. In other words, in terms of a location relationship, an offset of half a PRB exists between the first PRB grid and the second PRB grid. Certainly, content indicated by "0" and content indicated by "1" may be reversed, and this is not limited in this application.

Case 3: It is assumed that a size of the SS raster is 180 kHz, a size of the channel raster is 100 kHz, and the subcarrier spacing of the SS is 15 kHz.

A location of the center frequency of the SS is 180*n kHz, a location of the center frequency of the carrier is 100*m kHz, and a size of a PRB corresponding to the subcarrier spacing of 15 kHz is 180 kHz. A frequency offset between the center frequency of the carrier and the center frequency of the SS is |180*n−100*m| kHz, where m and n are both non-negative integers, and "||" represents acquisition of an absolute value. In this case, the frequency offset between the center frequency of the carrier and the center frequency of the SS varies depending on values of m and n. Therefore, there are a plurality of possibilities for the frequency offset $F_1$ between the first PRB grid and the second PRB grid.

In an implementation, indication information may be used to directly indicate the frequency offset $F_1$ between the first PRB grid and the second PRB grid. In another implementation, an offset set is predefined. The offset set includes all possible values of the frequency offset between the first PRB grid and the second PRB grid. In this example, the offset set may be {0, 10, 20, 30, 40, 60, 70, 80, 90, 100, 110, 120, 130, 140, 160, 170} kHz, 16 values in total. In this case, 4-bit indication information $I_1$ may be used to indicate a value in the offset set. The terminal and the network device have a consistent understanding of content indicated by the indication information $I_1$. In addition, 1-bit indication information or one indicator bit is further used to indicate an offset direction.

In addition, the frequency offset between the first PRB grid and the second PRB grid varies depending on different offset directions. Therefore, in an implementation, an offset in a high frequency direction or an offset in a low frequency direction may be predefined. In other words, the offset direction is predefined. The network device and the terminal have a consistent understanding of the offset direction. In another implementation, another piece of indication information $I_2$ is added or 1 bit is added to the indication information, to indicate the offset direction. For example, "0" is used to indicate offsetting in the low frequency direction, and "1" is used to indicate offsetting in the high frequency direction. Certainly, content indicated by "0" and content indicated by "1" may be reversed, and this is not limited in this application.

When the frequency offset between the center frequency of the carrier and the center frequency of the SS is not an integral multiple of ½ of a size of a PRB, the manner in case 3 may be used to indicate the frequency offset $F_1$ between the first PRB grid and the second PRB grid.

For example, the size of the SS raster is 180 kHz, the size of the channel raster is 100 kHz, and the subcarrier spacing of the SS is 15 kHz. When the offset direction is offsetting in the low frequency direction, the offset set may be {0, 10, 20, 30, 40, 60, 80, 90, 100, 110, 120, 130, 140, 160} kHz; or when the offset direction is offsetting in the high frequency direction, the offset set may be {0, 20, 40, 60, 70, 80, 90, 100, 120, 140, 160, 170} kHz.

Case 4: It is assumed that a size of the SS raster is 100 kHz, a size of the channel raster is 100 kHz, and the subcarrier spacing of the SS is 15 kHz.

A location of the center frequency of the SS is 100*n kHz, a location of the center frequency of the carrier is 100*m kHz, and a size of a PRB corresponding to the subcarrier spacing of 15 kHz is 180 kHz. A frequency offset between the center frequency of the carrier and the center frequency of the SS is |100*n−100*m| kHz, where m and n are both non-negative integers, and "||" represents acquisition of an absolute value. In this case, it may be considered that the SS raster is aligned with the channel raster.

When a quantity of PRBs at the subcarrier spacing of 15 kHz in the carrier is an even number, the first PRB grid is aligned with the second PRB grid. When the quantity of PRBs at the subcarrier spacing of 15 kHz in the carrier is an odd number, an offset of 10 kHz or 90 kHz exists between the first PRB grid and the second PRB grid. In this case, an offset direction may be predefined as offsetting in a high frequency direction or offsetting in a low frequency direction. 1-bit indication information $I_1$ is used to indicate the frequency offset $F_1$ between the first PRB grid and the second PRB grid. One value indicates that the frequency offset is 0; in other words, there is no offset. The other value indicates an offset of 10 kHz or 90 kHz. Alternatively, 2-bit indication information $I_1$ may be used to indicate a frequency offset value and an offset direction. For example, "00" indicates that the frequency offset is 0; in other words, there is no offset. "01" indicates that the first PRB grid is offset by 10 kHz in the low frequency direction (or is offset by 90 kHz in the high frequency direction), to obtain the second PRB grid. "10" indicates that the first PRB grid is offset by 10 kHz in the high frequency direction (or is offset by 90 kHz in the low frequency direction), to obtain the second PRB grid.

Likewise, when the size of the SS raster is 100 kHz, the size of the channel raster is 100 kHz, and the subcarrier spacing of the SS is 30 kHz; and when a quantity of PRBs at the subcarrier spacing of 30 kHz in the carrier is an even number, the first PRB grid is aligned with the second PRB grid; or when a quantity of PRBs at the subcarrier spacing of 30 kHz in the carrier is an odd number, an offset of 20 kHz or 80 kHz exists between the first PRB grid and the second PRB grid. An indication manner is the same as in the foregoing description, and details are not described herein again.

Case 5: This case is applicable to a high frequency communications system, namely, a communications system in which a frequency of a carrier is higher than 6 GHz.

For example, a size of the SS raster is 2880 kHz, a size of the channel raster is 720 kHz, and the subcarrier spacing of the SS is 120 kHz. In this case, regardless of whether a quantity of 120 kHz PRBs in the carrier is an odd number or an even number, an offset value between the channel raster and the SS raster is 720*k. Therefore, it can be ensured that the first PRB grid is aligned with the second PRB grid, and the indication information $I_1$ may not be broadcast in a PBCH in a high frequency communications system.

For another example, a size of the SS raster is 11520 kHz, a size of the channel raster is 720 kHz, and the subcarrier spacing of the SS is 240 kHz. In this case, regardless of whether a quantity of 240 kHz PRBs in the carrier is an odd number or an even number, an offset value between the channel raster and the SS raster is 720*k. It can be learned that in a high frequency communications system, the SS raster is an integral multiple of the channel raster. Therefore, it can be ensured that the first PRB grid is aligned with the second PRB grid, and the indication information $I_1$ may not be broadcast in a PBCH in a high frequency communications system.

In the foregoing cases, the size of the SS raster, the size of the channel raster, and the subcarrier spacing of the SS may be determined based on a frequency of the carrier, for example, determined based on a frequency band in which the carrier is located. For example, a 1.8 GHz carrier frequency band supports Case 2. In this frequency band, a relationship between the first PRB grid and the second PRB grid is indicated by using the indication information L. For another example, a 3.5 GHz carrier frequency band supports Case 1. In this frequency band, a relationship between two PRBs may not be indicated, or a frequency offset of 0 is indicated, and the terminal considers by default that the first PRB is aligned with the second PRB. For details, refer to Table 1 below.

TABLE 1

| Carrier frequency f | Subcarrier spacing of an SS | SS raster | Channel raster | Indication information |
|---|---|---|---|---|
| f < 3 GHZ | 15 kHz | 360 kHz | 180 kHz | Case 2: The indication information indicates that a frequency offset is o or half of a PRB |
| | | 180 kHz | 100 kHz | Case 3: The indication information indicates a frequency offset (with a plurality of values) |
| | | 100 kHz | 100 kHz | Case 4: The indication information indicates a frequency offset (with two values) |

TABLE 1-continued

| Carrier frequency f | Subcarrier spacing of an SS | SS raster | Channel raster | Indication information |
|---|---|---|---|---|
| 3 GHz < f < 6 GHz | 30 kHz | 360 kHz | 180 kHz | Case 1: The indication information indicates that a frequency offset is o, or the indication information is not sent |
| | | 180 kHz | 100 kHz | Case 3: The indication information indicates a frequency offset (with a plurality of values) |
| | | 100 kHz | 100 kHz | Case 4: The indication information indicates a frequency offset (with two values) |
| 6 GHz < f < 45 GHz | 120 kHz | 2880 kHz | 720 kHz | Case 5: The indication information indicates that a frequency offset is o, or the indication information is not sent |
| f > 45 GHz | 240 kHz | 11,520 kHz | 720 kHz | Case 5: The indication information indicates that a frequency offset is o, or the indication information is not sent |

For Case 1 and Case 5, besides a case in which the indication information indicates that the frequency offset is 0, the indication information $I_1$ may not be sent. For example, in a high frequency communications system, the indication information $I_1$ may not be transmitted by default. The terminal assumes (or considers by default) that a PRB grid used for an SS (or an SS block) is the same as (or consistent with) a PRB grid used for a carrier.

In the foregoing table, one or more combinations of the subcarrier spacing of the SS, the SS raster, and the channel raster in different frequency ranges may be selected, and this is not limited in this application.

In another solution of this application, the terminal assumes (or considers by default) that (a structure of) a PRB grid used for an SS (or an SS block) is the same as (or consistent with) (a structure of) a PRB grid used for a carrier. In this case, the terminal considers by default that the PRB grid used for the SS (or the SS block) is the PRB grid used for the carrier, so as to correctly transmit and receive data/control information on the data/control channel. In this case, the network device may determine a size X of the SS raster, a size Y of the subcarrier spacing, and a size Z of the channel raster based on the frequency of the carrier, so that $X=Z*M1$, and $Y*12=Z*N1$, where M1 and N1 are integers greater than or equal to 2. Because the foregoing formula is met, (a structure of) the PRB grid used for the SS (or the SS block) is the same as (or consistent with) (a structure of) the PRB grid used for the carrier, which is consistent with the assumption of the terminal. Therefore, the terminal can correctly transmit and receive data/control information on the data/control channel.

Figure 9:
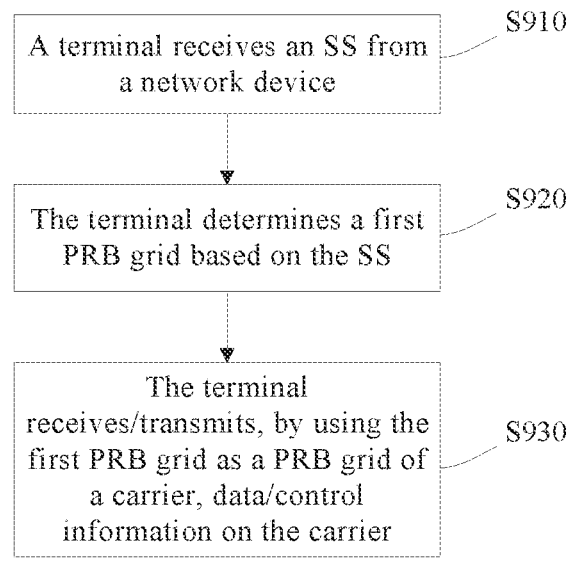
FIG. 9 is a schematic diagram of another communication method according to an embodiment of this application.

FIG. 9 is a schematic diagram of another communication method according to an embodiment of this application. In the method, a terminal considers by default that a PRB grid used for an SS is the same as or aligned with a PRB grid used for a carrier. As shown in FIG. 9, the method includes the following steps:

S910. The terminal receives an SS from a network device.

S920. The terminal determines a first PRB grid based on the SS, where the first PRB grid is aligned (or consistent) with a PRB grid used for data/control information transmission on a carrier.

S930. The terminal receives/transmits, by using the first PRB grid as the PRB grid of the carrier, data/control information on the carrier.

A process in which the terminal receives the SS and determines the first PRB grid based on the SS is the same as steps S620 and S630 in the foregoing embodiment, and details are not described herein again.

In the foregoing step S930, the terminal considers by default that a PRB grid used for the SS is the same as or aligned with a PRB grid used for the carrier, and the PRB grid used for the SS is used as the PRB grid of the carrier. Because the PRB grid used for data/control information transmission on the carrier is aligned with the PRB grid used for the SS, the terminal can correctly interpret a frequency resource and receive and transmit data/control information.

Figure 10:
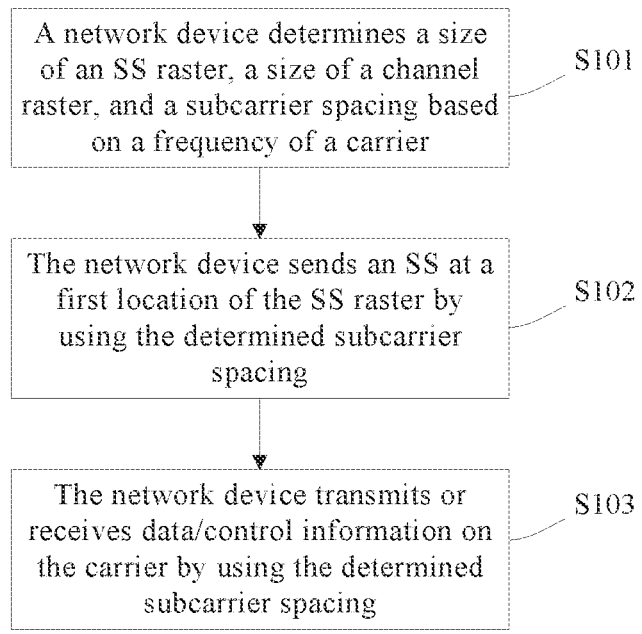
FIG. 10 is a schematic diagram of still another communication method according to an embodiment of this application.

FIG. 10 is a schematic diagram of still another communication method according to an embodiment of this application. In the method, a terminal considers by default that a PRB grid used for an SS is the same as or aligned with a PRB grid used for a carrier. As shown in FIG. 10, the method includes the following steps:

S101. A network device determines a size of an SS raster, a size of a channel raster, and a subcarrier spacing based on a frequency of a carrier.

S102. The network device sends an SS at a first location of the SS raster by using the determined subcarrier spacing, where a center frequency of the SS is located at the first location.

S103. The network device transmits or receives data/control information on the carrier by using the determined subcarrier spacing, where a PRB grid used for the carrier is the same as a PRB grid used for the SS.

The size of the SS raster is X, the size of the subcarrier spacing is Y, and the size of the channel raster is Z, where $X=Z*M1$, $Y*12=Z*N1$, and M1 and N1 are integers greater than or equal to 2.

Figure 11:
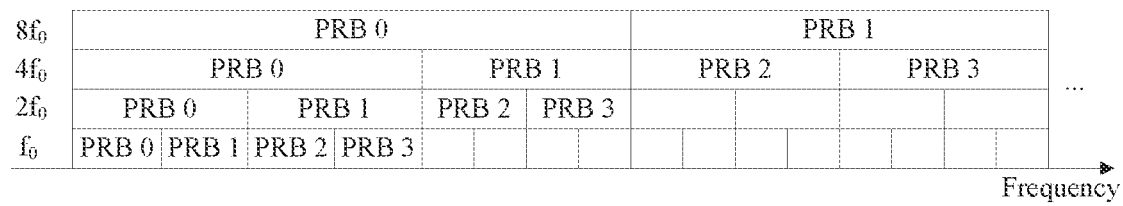
FIG. 11 is a schematic diagram of PRB grids corresponding to a plurality of subcarrier spacings according to an embodiment of this application.

An NR communications system supports a plurality of subcarrier spacings, such as {3.75, 7.5, 15, 30, 60, 120, 240, 480} kHz. A plurality of subcarrier spacings can be supported on one carrier, and PRBs corresponding to different subcarrier spacings are located on PRB grids. In other words, there are different PRB grids for different subcarrier spacings. PRB grids corresponding to different subcarrier spacings are in a nesting relationship in frequency domain. For example, FIG. 11 is a schematic diagram of PRB grids corresponding to a plurality of subcarrier spacings according to an embodiment of this application, where $f_0$, $2f_0$, $4f_0$, and $8f_0$ on a left side represent subcarrier spacings, and grids corresponding to these subcarrier spacings represent PRB grids for corresponding subcarrier spacings. It can be learned that PRB grids corresponding to different subcarrier spacings are in a nesting relationship in frequency domain. After determining a PRB grid corresponding to a subcarrier spacing, a terminal cannot determine another PRB grid corresponding to a subcarrier spacing that is greater than the subcarrier spacing. For example, as shown in FIG. 11, a boundary of a PRB grid corresponding to the subcarrier spacing $f_0$ may fall on a boundary of a PRB grid corresponding to the subcarrier spacing $2f_0$, or may fall at a center of a PRB in a PRB grid corresponding to the subcarrier spacing $2f_0$. Therefore, the terminal cannot determine the PRB grid corresponding to the subcarrier spacing $2f_0$. If the terminal determines the PRB grid corresponding to the subcarrier spacing $2f_0$, the boundary of the PRB grid corresponding to the subcarrier spacing $f_0$ is only on the boundary of the PRB grid corresponding to the subcarrier spacing $2f_0$. Therefore, the PRB grid corresponding to the subcarrier spacing $f_0$ may be directly determined based on the subcarrier spacing $f_0$.

In consideration of this problem, an embodiment of this application provides another communication method. In the method, a network device sends indication information $I_3$ to a terminal, where the indication information $I_3$ is used to indicate a frequency offset between PRB grids corresponding to different subcarrier spacings. In this way, the terminal can determine an unknown PRB grid based on a known PRB grid and the frequency offset. The known PRB grid may be the PRB grid $G_1$ in the foregoing embodiments. In other words, a subcarrier spacing corresponding to the known PRB grid is the same as a subcarrier spacing of an SS. Therefore, a method for obtaining the known PRB grid is the same as a method for obtaining the PRB grid $G_1$ in the foregoing embodiments. Details are not described herein again.

Figure 12:
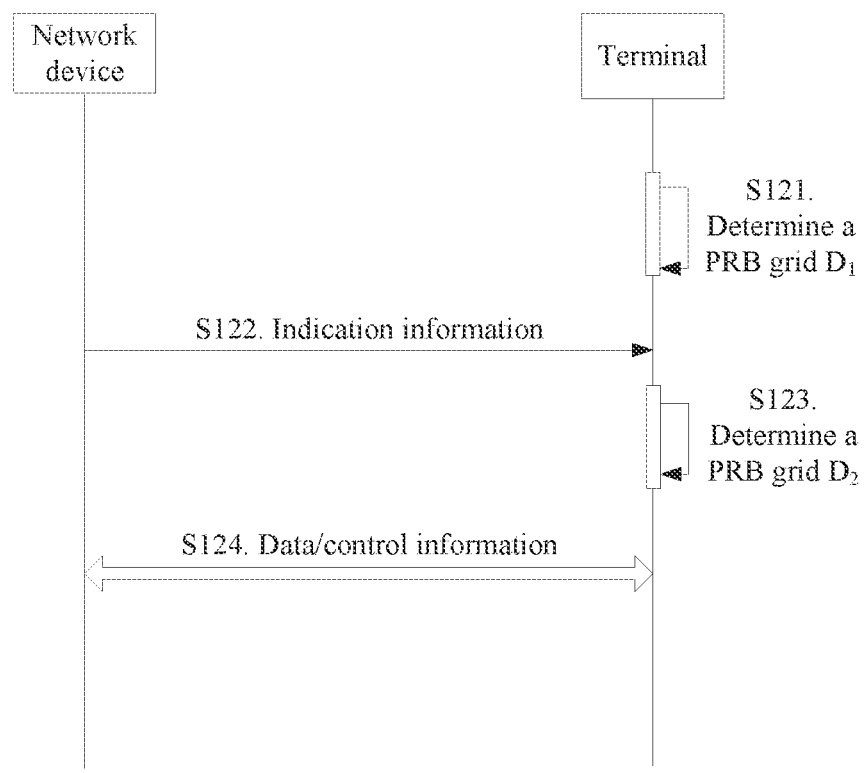
FIG. 12 is a schematic diagram of another communication method according to an embodiment of this application.

FIG. 12 is a schematic diagram of yet another communication method according to an embodiment of this application. As shown in FIG. 12, the method includes the following steps:

S121. A terminal determines a PRB grid $D_1$, where a subcarrier spacing corresponding to the PRB grid $D_1$ is $S_1$.

S122. A network device sends indication information $I_3$ to the terminal, where the indication information is used to indicate a frequency offset $F_2$ between the PRB grid $D_1$ and a PRB grid $D_2$, a subcarrier spacing corresponding to the PRB grid $D_2$ is $S_2$, and the subcarrier spacing $S_2$ is greater than the subcarrier spacing $S_1$. The terminal receives the indication information $I_3$ from the network device, and performs the following step S123.

S123. The terminal determines the PRB grid $D_2$ based on the PRB grid $D_1$ and the frequency offset $F_2$.

Then data/control information transmission (S124) is performed between the terminal and the network device. The network device allocates a resource for the data/control information transmission to the terminal based on the PRB grid $D_2$. After the terminal determines the PRB grid $D_2$, the terminal has a consistent understanding of the resource as the network device, thereby improving correctness of the data/control information transmission.

The PRB grid $D_1$ may be the PRB grid $G_1$ in the foregoing embodiments. The terminal may determine the PRB grid $D_1$ by using a method in the foregoing embodiments. Details are not described herein again. Alternatively, the terminal considers by default that the PRB grid $D_1$ (a PRB grid $G_1$) is the same as (or consistent with) a PRB grid (a PRB grid $G_0$) used for an SS (or an SS block). After detecting the SS, the terminal directly determines the PRB grid $D_1$ based on the detected SS.

The subcarrier spacing $S_1$ corresponding to the PRB grid $D_1$ may be the subcarrier spacing of the SS. The subcarrier spacing $S_2$ corresponding to the PRB grid $D_2$ is greater than the subcarrier spacing of the SS.

The network device may send the indication information $I_3$ through a PBCH, and then the terminal may receive the indication information $I_3$ through the PBCH. Alternatively, the network device may send the indication information $I_3$ by using remaining minimum system information (RMSI), and then the terminal receives the RMSI, where the RMSI carries the indication information $I_3$. Alternatively, the network device may send the indication information $I_3$ by using higher layer signaling, for example, a radio resource control (RRC) message, and then the terminal receives the higher layer signaling, where the higher layer signaling carries the indication information $I_3$.

The method in this embodiment can be combined with the methods in the foregoing embodiments. When a carrier supports a plurality of subcarrier spacings, the plurality of subcarrier spacings include the subcarrier spacing $S_1$ and the subcarrier spacing $S_2$, where the subcarrier spacing $S_1$ is the same as the subcarrier spacing of the SS, and the subcarrier spacing $S_2$ is different from the subcarrier spacing of the SS. When detecting the SS, the terminal may determine a PRB grid used for the SS based on the SS. When the terminal considers by default that a PRB grid used for an SS is the same as a PRB grid used for a carrier, the PRB grid of the SS may be used as the PRB grid $D_1$. When the terminal determines a PRB grid used for the carrier based on the indication information $I_1$ sent by the network device, the terminal determines the PRB grid $D_1$ based on the indication information $I_1$ in the foregoing embodiments; and then determines the PRB grid $D_2$ based on the PRB grid $D_1$ and the indication information $I_3$. In this way, correct transmission of data/control information on a carrier that supports the subcarrier spacings $S_1$ and $S_2$ can be implemented. More subcarrier spacings are similar thereto, and details are not described herein again.

Figure 13:
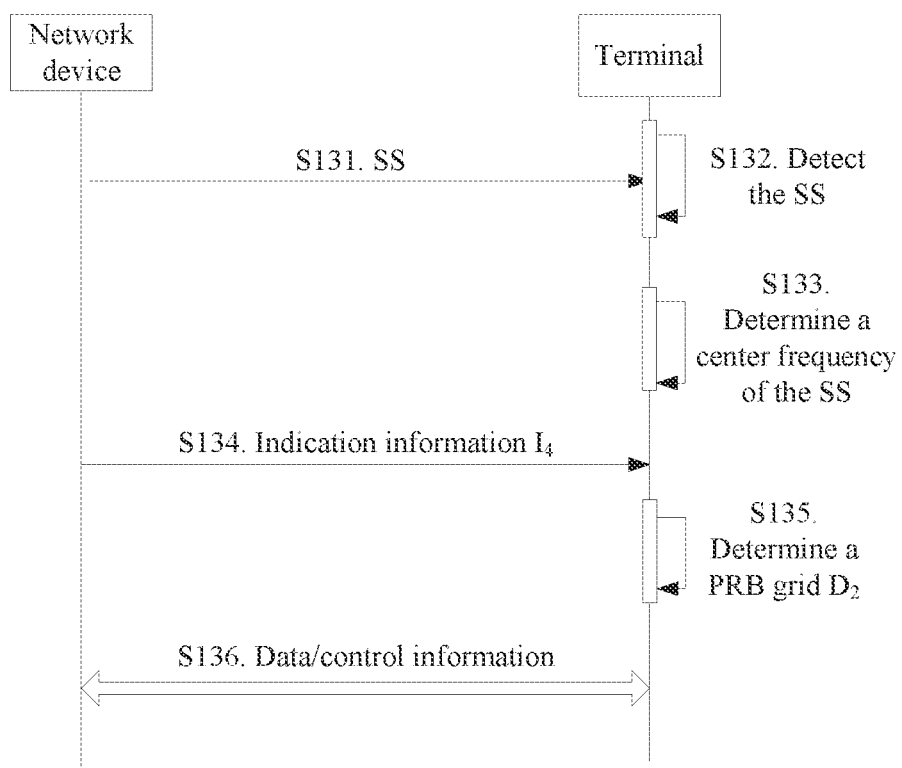
FIG. 13 is a schematic diagram of another communication method according to an embodiment of this application.

The terminal considers by default that the PRB grid $D_1$ (a PRB grid $G_1$) is the same as a PRB grid $G_0$ used for an SS (or an SS block). After detecting the SS, the terminal determines the PRB grid $D_2$ based on the detected SS. FIG. 13 is a schematic diagram of another communication method according to an embodiment of this application. As shown in FIG. 13, the method includes the following steps:

S131. A network device sends an SS to a terminal.

S132. The terminal detects the SS.

S133. When the SS is detected, the terminal determines a center frequency of the SS.

S134. The network device sends indication information $I_4$ to the terminal, where the indication information $I_4$ is used to indicate a frequency offset $F_3$ between the center frequency of the SS and a boundary of a PRB grid $D_2$.

S135. The terminal determines the PRB grid $D_2$ based on the center frequency of the SS and the frequency offset $F_3$.

Then data/control information transmission (S136) is performed between the terminal and the network device. The network device allocates a resource for the data/control information transmission to the terminal based on the PRB grid $D_2$. After the terminal determines the PRB grid $D_2$, the terminal has a consistent understanding of the resource as the network device, thereby improving correctness of the data/control information transmission.

A subcarrier spacing $S_2$ corresponding to the PRB grid $D_2$ is greater than a subcarrier spacing of the SS.

The network device may send the indication information $I_4$ through a PBCH, and then the terminal may receive the indication information $I_4$ through the PBCH. Alternatively, the network device may send the indication information $I_4$ by using RMSI, and then the terminal receives the RMSI, where the RMSI carries the indication information $I_4$. Alternatively, the network device may send the indication information $I_4$ by using higher layer signaling, for example, an RRC message, and then the terminal receives the higher layer signaling, where the higher layer signaling carries the indication information 14.

Figure 14:
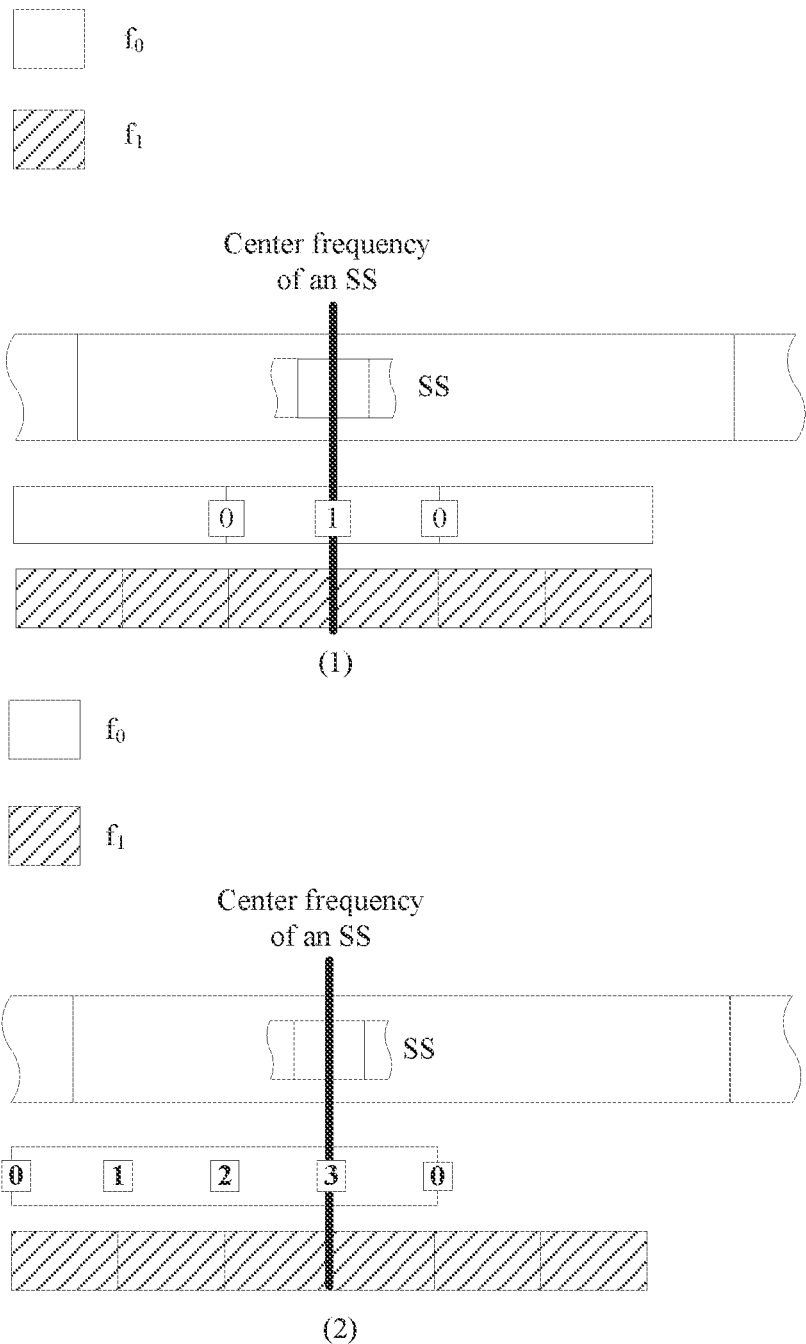
FIG. 14 is a schematic diagram of a PRB grid according to an embodiment of this application.

FIG. 14 is a schematic diagram of a PRB grid according to an embodiment of this application. It is assumed that a subcarrier spacing corresponding to a PRB grid $D_1$ or a subcarrier spacing of an SS is a reference subcarrier spacing $f_0$, and a subcarrier spacing corresponding to a PRB grid $D_2$ is $f_1$. As shown in FIG. 14 (1), f1/f0=2. For the embodiment shown in FIG. 12, a boundary of the PRB grid $D_1$ may be located at a boundary (for example, a location 0 in FIG. 14 (1)) of the PRB grid $D_2$, or may be located at a center (for example, a location 1 in FIG. 14 (1)) of a PRB of the PRB grid $D_2$. In this case, 1-bit indication information $I_3$ may be used to indicate the location. For example, "0" indicates the location 0 and "1" indicates the location 1. Certainly, meanings of values of the indication information $I_3$ may also be reversed, and this is not limited. For the embodiment shown in FIG. 13, a center frequency of the SS (or an SS block) may be located at a boundary (for example, a location 0 in FIG. 14 (1)) of the PRB grid $D_2$, or may be located at a center (for example, a location 1 in FIG. 14 (1)) of a PRB of the PRB grid $D_2$. In this case, 1-bit indication information $I_4$ may be used to indicate the location. For example, "0" indicates the location 0 and "1" indicates the location 1. Certainly, meanings of values of the indication information $I_4$ may also be reversed, and this is not limited. The foregoing locations may be indicated by using a frequency offset. To be specific, the location 0 indicates that a frequency offset $F_2$ or $F_3$ is 0 and the location 1 indicates that the frequency offset $F_2$ or $F_3$ is half a PRB. A subcarrier spacing corresponding to the PRB is the same as the subcarrier spacing corresponding to the PRB grid $D_2$.

As shown in FIG. 14 (2), f1/f0=4. For the embodiment shown in FIG. 12, a boundary of the PRB grid $D_1$ may be located at a boundary (for example, a location 0 in FIG. 14 (2)) of the PRB grid $D_2$, or may be located at a location (for example, a location 1 in FIG. 14 (2)) that is ¼ of a PRB of the PRB grid $D_2$, or may be located at a center (for example, a location 2 in FIG. 14 (2)) of a PRB of the PRB grid $D_2$, or may be located at a location (for example, a location 3 in FIG. 14 (2)) that is ¾ of a PRB of the PRB grid $D_2$. In this case, 2-bit indication information $I_3$ may be used to indicate the location. For example, "00" indicates the location 0 "01" indicates the location 1, "10" indicates the location 2, and "11" indicates the location 3. For the embodiment shown in FIG. 13, a center frequency of the SS (or an SS block) may be located at a boundary (for example, a location 0 in FIG. 14 (2)) of the PRB grid $D_2$, or may be located at a location (for example, a location 1 in FIG. 14 (2)) that is ¼ of a PRB of the PRB grid $D_2$, or may be located at a center (for example, a location 2 in FIG. 14 (2)) of a PRB of the PRB grid $D_2$, or may be located at a location (for example, a location 3 in FIG. 14 (2)) that is ¾ of a PRB of the PRB grid $D_2$. In this case, 2-bit indication information $I_4$ may be used to indicate the location. For example, "00" indicates the location 0 "01" indicates the location 1, "10" indicates the location 2, and "11" indicates the location 3. The foregoing locations may be indicated by using a frequency offset. To be specific, the location 0 indicates that a frequency offset $F_2$ or $F_3$ is 0 the location 1 indicates that the frequency offset $F_2$ or $F_3$ is ¼ of a PRB, the location 2 indicates that the frequency offset $F_2$ or $F_3$ is ½ of a PRB, and the location 3 indicates that the frequency offset $F_2$ or $F_3$ is ¾ of a PRB. A subcarrier spacing corresponding to the PRB is the same as the subcarrier spacing corresponding to the PRB grid $D_2$. Possible location numbers of a PRB in the PRB grid $D_2$ may be predefined from a low frequency domain location number to a high frequency domain location number, or predefined from a high frequency domain location number to a low frequency domain location number. Alternatively, 1 bit is used to indicate a numbering direction, namely, an offset direction.

As described in the foregoing embodiments, the PRB grid $D_2$ may be used for data/control information transmission. For example, the PRB grid $D_2$ may be used for RMSI transmission. In this case, the PRB grid $D_2$ is a PRB grid of the RMSI. Therefore, any method for determining the PRB grid $D_2$ provided in the foregoing embodiments may be used to determine the PRB grid of the RMSI. The PRB grid of the RMSI is a PRB grid corresponding to a subcarrier spacing that is used to transmit the RMSI. In this case, the subcarrier spacing of the RMSI is the subcarrier spacing $S_2$ corresponding to the PRB grid $D_2$. The following is described with reference to the accompanying drawings by using an example in which the PRB grid $D_2$ is the PRB grid of the RMSI.

Figure 24:
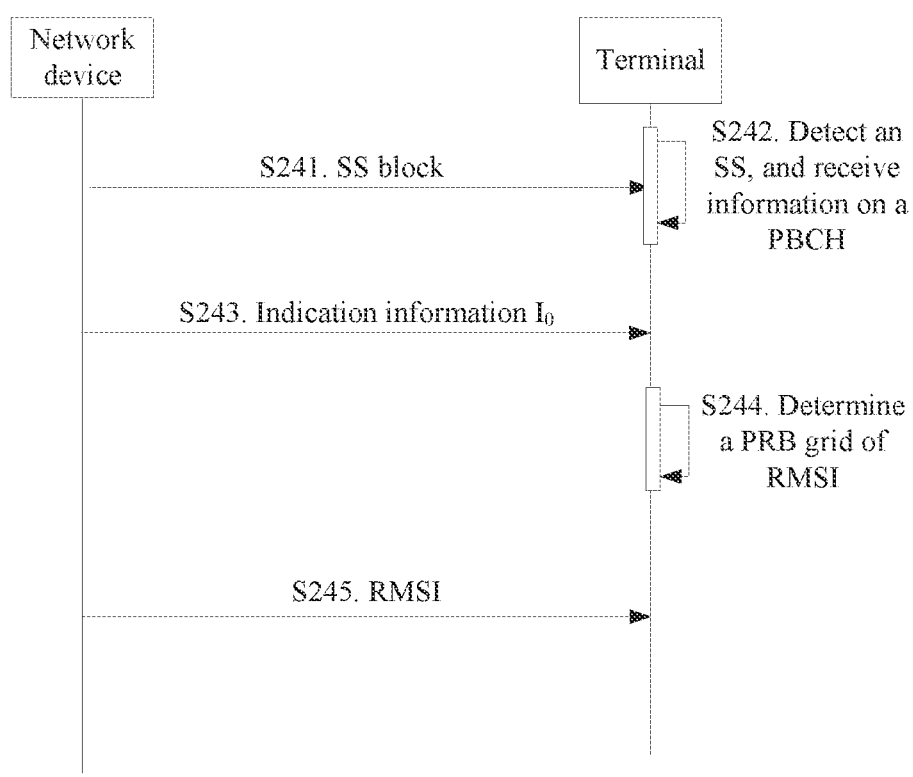
FIG. 24 is a schematic diagram of still another communication method according to an embodiment of this application.

FIG. 24 is a schematic diagram of a still another communication method according to an embodiment of this application. As shown in FIG. 24, the method includes the following steps.

S241. A network device sends an SS block.

The SS block includes an SS and a PBCH, where information about a subcarrier spacing $S_2$ of RMSI is carried on the PBCH.

S242. The terminal detects an SS, and receives information on a PBCH.

After detecting the SS, the terminal may determine a center frequency of the SS, and then receive, on 24 PRBs that center on the center frequency, the information on the PBCH. In this way, the terminal may obtain the subcarrier spacing $S_2$ of the RMSI. Because the subcarrier spacing $S_2$ of the RMSI may be different from a subcarrier spacing of the SS, as described in the foregoing embodiments, when the subcarrier spacing $S_2$ of the RMSI is greater than the subcarrier spacing of the SS, the network device indicates a frequency offset $F_2$ between a PRB grid $D_1$ and a PRB grid $D_2$ to the terminal, so that the terminal determines the PRB grid $D_2$ of the RMSI based on the PRB grid $D_1$. For example, the network device sends indication information $I_0$ to the terminal, where the indication information is used to determine a PRB grid of the RMSI. In this case, the method further includes the following steps:

S243. The network device sends indication information $I_0$ to the terminal, where the indication information is used to determine a PRB grid of RMSI.

The network device may send the indication information $I_0$ through the PBCH.

S244. The terminal receives the indication information $I_0$ and determines the PRB grid of the RMSI based on the indication information $I_0$.

Specifically, the terminal determines the PRB grid $D_1$ by using any method in the foregoing embodiments, and then determines the PRB grid of the RMSI based on the PRB grid $D_1$ and the indication information $I_0$.

S245. The terminal receives the RMSI based on the determined PRB grid of the RMSI.

Several implementation solutions of the indication information $I_0$ are separately described below. These implementation solutions of the indication information $I_0$ are applicable to any one of the foregoing solutions for determining the PRB grid $D_2$. The PRB grid $D_2$ is, for example, the PRB grid of the RMSI in FIG. 24.

Solution 1: The indication information indicates a relative location between the PRB grid $D_1$ and the PRB grid $D_2$.

The indication information $I_0$ may include two information bits. For different subcarrier spacings $S_1$ corresponding to the PRB grid $D_1$ and different subcarrier spacings $S_2$ corresponding to the PRB grid $D_2$, explanations of the two information bits are different.

Figure 25:
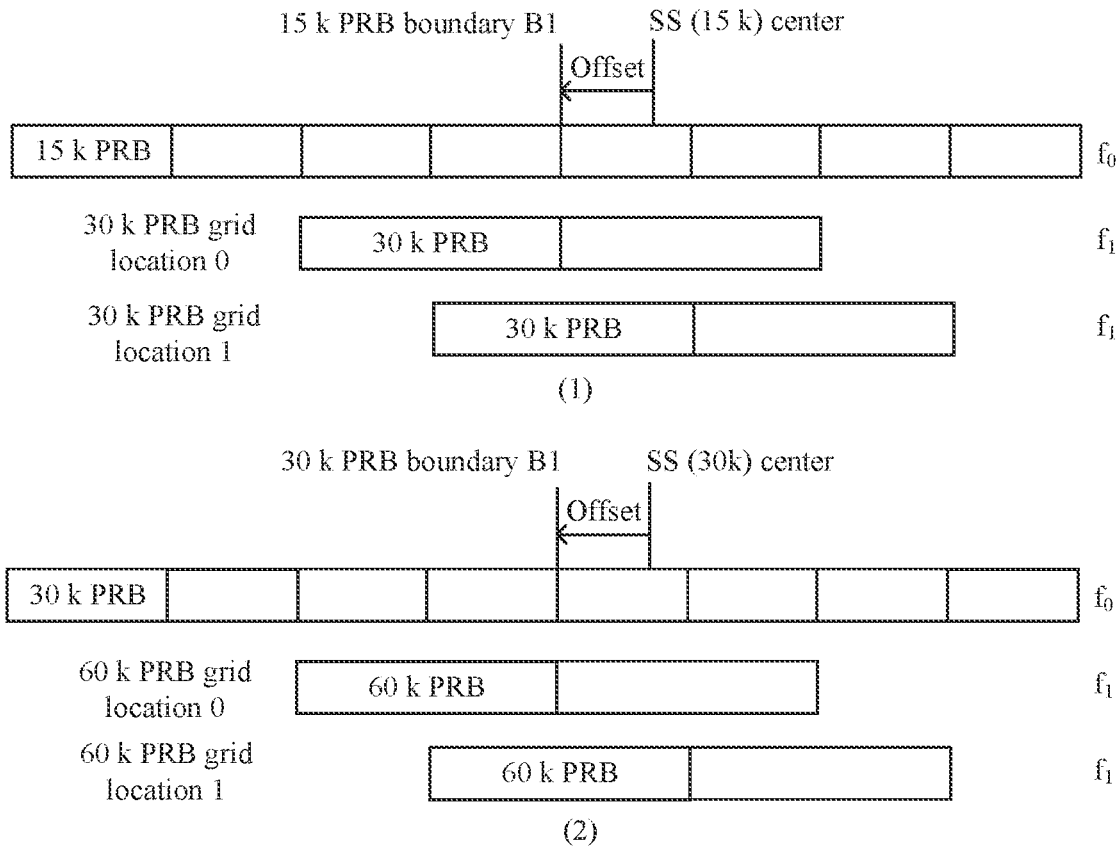
FIG. 25 is a schematic diagram of a PRB grid according to an embodiment of this application.

FIG. 25 is a schematic diagram of a PRB grid according to an embodiment of this application. It is assumed that a subcarrier spacing corresponding to a PRB grid $D_1$ is a reference subcarrier spacing $f_0$, and the subcarrier spacing is equal to a subcarrier spacing of an SS; and a subcarrier spacing corresponding to a PRB grid $D_2$ is $f_1$. As shown in FIG. 25, FIG. 25 (1) shows an example in which the subcarrier spacing $f_0$ is 15 kHz and the subcarrier spacing $f_1$ is 30 kHz, and FIG. 25 (2) shows an example in which the subcarrier spacing $f_0$ is 30 kHz and the subcarrier spacing $f_1$ is 60 kHz, where f1/f0=2. In this case, a boundary of the PRB grid $D_1$ (using a boundary B1 in FIG. 25 as an example) may be located at a boundary (indicated by a location 0 in FIG. 25) of the PRB grid $D_2$, or may be located at a center (indicated by a location 1 in FIG. 25) of a PRB of the PRB grid $D_2$.

In this case, 2-bit indication information $I_0$ may be used to indicate the grid location. For example, "00" indicates the location 0 "01" indicates the location 1, and "10" and "11" are used as reserved information bits. Certainly, there may also be another explanation for meanings of values of the indication information $I_0$ For example, "10" indicates the location 0, "11" indicates the location 1, and "00" and "01" are used as reserved information bits. This is not limited. The foregoing grid location may be indicated by using a frequency domain offset. To be specific, "00" indicates that the frequency domain offset is 0 and "01" indicates that the frequency domain offset is half a PRB or six subcarriers, where a subcarrier spacing corresponding to the PRB or the subcarriers is the same as the subcarrier spacing corresponding to the PRB grid $D_2$. Alternatively, "00" indicates that the frequency domain offset is 0 and "01" indicates that the offset is one PRB or 12 subcarriers, where a subcarrier spacing corresponding to the PRB or the subcarriers is the same as the subcarrier spacing corresponding to the PRB grid $D_1$.

Figure 26:
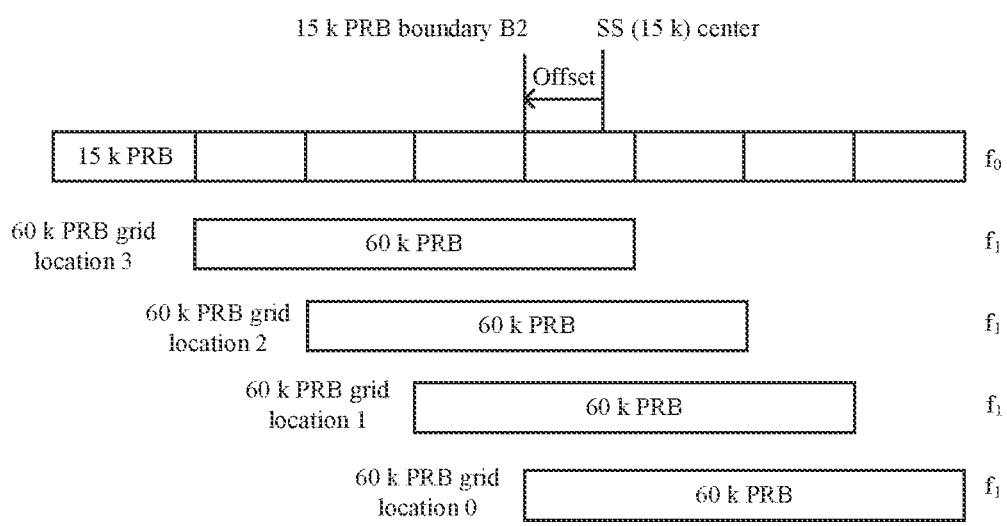
FIG. 26 is a schematic diagram of another PRB grid according to an embodiment of this application.

FIG. 26 is a schematic diagram of another PRB grid according to an embodiment of this application. It is assumed that a subcarrier spacing corresponding to a PRB grid $D_1$ is a reference subcarrier spacing $f_0$, and the subcarrier spacing is equal to a subcarrier spacing of an SS; and a subcarrier spacing corresponding to a PRB grid $D_2$ is $f_1$. As shown in FIG. 26, in an example in which the subcarrier spacing $f_0$ is 15 kHz, and the subcarrier spacing $f_1$ is 60 kHz and f1/f0=4, a boundary (for example, a boundary B2 in FIG. 26) of the PRB grid $D_1$ may be located at a boundary (indicated by a location 0 in FIG. 26) of the PRB grid $D_2$, or may be located at a location (indicated by a location 1 in FIG. 26) that is ¼ of a PRB of the PRB grid $D_2$, or may be located at a center (indicated by a location 2 in FIG. 26) of a PRB of the PRB grid $D_2$, or may be located at a location (indicated by a location 3 in FIG. 26) that is ¾ of a PRB of the PRB grid $D_2$. A frequency domain offset direction may be predefined as that a boundary B1 offsets from a low frequency domain location to a high frequency domain location, or may be predefined as that a boundary B1 offsets from a high frequency domain location to a low frequency domain location, or 1 bit is used to indicate the offset direction.

In this case, 2-bit indication information $I_0$ may be used to indicate the grid location. For example, "00" indicates the location 0 "01" indicates the location 1, "10" indicates the location 2, and "11" indicates the location 3. Certainly, there may also be another explanation for meanings of values of the indication information $I_0$ and this is not limited. The foregoing grid location may be indicated by using a frequency domain offset. For example, "00" indicates that the frequency domain offset is 0 "01" indicates that the frequency domain offset is ¼ of a PRB or three subcarriers, "10" indicates that the frequency domain offset is ½ of a PRB or six subcarriers, and "11" indicates that the frequency domain offset is ¾ of a PRB or nine subcarriers, where a subcarrier spacing corresponding to the PRB or the subcarriers is the same as the subcarrier spacing corresponding to the PRB grid $D_2$. Alternatively, "00" indicates that the frequency domain offset is 0 "01" indicates that the frequency domain offset is one PRB or 12 subcarriers, "10" indicates that the frequency domain offset is two PRBs or 24 subcarriers, and "11" indicates that the frequency domain offset is three PRBs or 36 subcarriers, where a subcarrier spacing corresponding to the PRB or the subcarriers is the same as the subcarrier spacing corresponding to the PRB grid $D_1$. A frequency domain offset direction may be predefined as that the boundary B2 offsets from a low frequency domain location to a high frequency domain location, or may be predefined as that the boundary B2 offsets from a high frequency domain location to a low frequency domain location, or 1 bit is used to indicate the offset direction.

In addition, an offset (an offset shown in FIG. 26) exists between a boundary of the foregoing PRB grid $D_1$ and a center frequency of the SS. This offset may be "0". In this case, a PRB grid of the SS may be used as the PRB grid $D_1$.

It can be learned that in this solution, the indication information $I_0$ may be used to indicate a relative location between the PRB grid $D_1$ and the PRB grid $D_2$, where the relative location may be a frequency domain offset or a location of a preset boundary of the PRB grid $D_1$ on the PRB grid $D_2$.

Solution 2: The indication information indicates a PRB grid corresponding to a maximum subcarrier spacing that is supported by a carrier frequency band, so as to implicitly obtain the PRB grid $D_2$.

The indication information $I_0$ may include two information bits, used to indicate a PRB grid corresponding to a maximum subcarrier spacing that is supported by a carrier frequency band. For example, in a carrier below 6 GHz, regardless of a size of a subcarrier of the RMSI, the indication information is used to indicate a PRB grid corresponding to 60 kHz.

If the subcarrier spacing of the SS is 15 kHz, the subcarrier spacing corresponding to the PRB grid $D_1$ is 15 kHz. In this case, the indication information $I_0$ indicates a relative location between a PRB grid $D_2'$ corresponding to the maximum subcarrier spacing that is supported by the carrier frequency band and the PRB grid $D_1$, where the relative location may be a frequency domain offset, or a location of a boundary of the PRB grid $D_1$ on the PRB grid $D_2'$. For example, if the indication information $I_0$ is "00", it indicates that the frequency domain offset is 0 "01" indicates that the frequency domain offset is ¼ of a PRB or three subcarriers, "10" indicates that the frequency domain offset is ½ of a PRB or six subcarriers, and "11" indicates that the frequency domain offset is ¾ of a PRB or nine subcarriers, where a subcarrier spacing corresponding to the PRB or the subcarriers is a maximum subcarrier spacing (60 kHz) supported by a current carrier frequency band. Alternatively, if the indication information $I_0$ is "00", it indicates that the frequency domain offset is 0 "01" indicates that the frequency domain offset is one PRB or 12 subcarriers, "10" indicates that the frequency domain offset is two PRBs or 24 subcarriers, and "11" indicates that the frequency domain offset is three PRBs or 36 subcarriers, where a subcarrier spacing corresponding to the PRB or the subcarriers is the subcarrier spacing of the SS. A frequency domain offset direction may be predefined as that a boundary B2 in the PRB grid $D_1$ offsets from a low frequency domain location to a high frequency domain location, or may be predefined as that a boundary B2 in the PRB grid $D_1$ offsets from a high frequency domain location to a low frequency domain location, or 1 bit is used to indicate the offset direction.

If the subcarrier spacing of the SS is 30 kHz, the subcarrier spacing corresponding to the PRB grid $D_1$ is 30 kHz. In this case, the indication information $I_0$ indicates a relative location between a PRB grid $D_2$" corresponding to the maximum subcarrier spacing that is supported by the carrier frequency band and the PRB grid $D_1$, where the relative location may be a frequency domain offset, or a location of a boundary of the PRB grid $D_1$ on the PRB grid $D_2$". For example, if the indication information $I_0$ is "00", it indicates that the frequency domain offset is 0 and "01" indicates that the frequency domain offset is half a PRB or six subcarriers, where a subcarrier spacing corresponding to the PRB or the subcarriers is a maximum subcarrier spacing (60 kHz) supported by a current carrier frequency band. Alternatively, if the indication information $I_0$ is "00", it indicates that the frequency domain offset is 0 and "01" indicates that the frequency domain offset is one PRB or 12 subcarriers, where a subcarrier spacing corresponding to the PRB or the subcarriers is the same as the subcarrier spacing of the SS. A frequency domain offset direction may be predefined as that a boundary B1 in the PRB grid $D_1$ offsets from a low frequency domain location to a high frequency domain location, or may be predefined as that a boundary B1 in the PRB grid $D_1$ offsets from a high frequency domain location to a low frequency domain location, or 1 bit is used to indicate the offset direction.

There may also be another explanation for meanings of values of the indication information $I_0$ and this is not limited.

When the PRB grid corresponding to the maximum subcarrier spacing that is supported by the current carrier frequency band is determined, the PRB grid $D_2$ may be determined based on a nesting relationship between different subcarrier spacings shown in FIG. 11.

It can be learned that in this solution, the indication information $I_0$ may be used to indicate a PRB grid corresponding to a maximum subcarrier spacing that is supported by a carrier frequency band, for example, indicate a relative location between the PRB grid $D_1$ and the PRB grid corresponding to the maximum subcarrier spacing that is supported by the carrier frequency band, where the relative location may be a frequency domain offset, or a location of a preset boundary of the PRB grid $D_1$ on the PRB grid corresponding to the maximum subcarrier spacing that is supported by the carrier frequency band.

Solution 3: The indication information indicates a relative location between the PRB grid $D_1$ and the PRB grid $D_2$.

In an initial access process, RMSI is used for a terminal to access a carrier. In this case, the subcarrier spacing of the RMSI is supported by all terminals. In a frequency band below 6 GHz, a 60 kHz subcarrier spacing may not be applicable to all terminals, and a candidate subcarrier spacing of the RMSI may be only 15 kHz or 30 kHz. In this case, 1-bit second indication information $I_0$ may be sent on the PBCH, to indicate a PRB grid corresponding to the subcarrier spacing of the RMSI.

For example, if the indication information $I_0$ is "0", it indicates that a frequency domain offset is 0 and "1" indicates that the offset is half a PRB or six subcarriers, where a subcarrier spacing corresponding to the PRB or the subcarriers is the subcarrier spacing of the RMSI. Alternatively, if the indication information $I_0$ is "0", it indicates that the frequency domain offset is 0 and "1" indicates that the frequency domain offset is one PRB or 12 subcarriers, where a subcarrier spacing corresponding to the PRB or the subcarriers is the same as the subcarrier spacing of the SS. A frequency domain offset direction may be predefined as that a boundary B1 or B2 in the PRB grid $D_1$ offsets from a low frequency domain location to a high frequency domain location, or may be predefined as that a boundary B1 or B2 in the PRB grid $D_1$ offsets from a high frequency domain location to a low frequency domain location, or 1 bit is used to indicate the offset direction.

There may also be another explanation for meanings of values of the indication information $I_0$ and this is not limited.

It can be learned that in this solution, there are two candidate subcarrier spacings of the RMSI, and the indication information $I_0$ includes one information bit, and may be used to indicate a relative location between the PRB grid $D_1$ and the PRB grid $D_2$, where the relative location may be a frequency domain offset, or a location of a preset boundary of the PRB grid $D_1$ on the PRB grid $D_2$.

Solution 4: The indication information jointly indicates the subcarrier spacing of the RMSI and the PRB grid of the RMSI.

In an initial access process, RMSI is used for a terminal to access a carrier. In this case, the subcarrier spacing of the RMSI is supported by all terminals. In a frequency band below 6 GHz, a 60 kHz subcarrier spacing may not be applicable to all terminals, and a candidate subcarrier spacing of the RMSI is only 15 kHz or 30 kHz. In this case, 2-bit indication information $I_0$ may be sent on the PBCH, to indicate the subcarrier spacing of the RMSI and the PRB grid of the RMSI.

When the subcarrier spacing $S_1$ of the SS is 15 kHz, the subcarrier spacing of the RMSI is $S_2$, and meanings of values of the indication information $I_0$ may be shown in Table 3 below:

TABLE 3

| $I_0$ | $S_2$ |
|---|---|
| 00 | 15 kHz |
| 01 | 30 kHz, where a grid boundary is a candidate location 1 |
| 10 | 30 kHz, where a grid boundary is a candidate location 2 |
| 11 | Reserved |

The candidate locations in the table may be shown in FIG. 25 (1), and are respectively a location 0 and a location 1. The candidate location 1 may be the location 0 and the candidate location 2 may be the location 1; or the candidate location 1 may be the location 1, and the candidate location 2 may be the location 0.

The foregoing locations may also be indicated by using a frequency domain offset, as shown in Table 4 below:

TABLE 4

| $I_0$ | $S_2$ |
|---|---|
| 00 | 15 kHz, and offset by zero PRBs (where a subcarrier spacing is $S_1$) |
| 01 | 30 kHz, and offset by zero PRBs (where a subcarrier spacing is $S_1$) |
| 10 | 30 kHz, and offset by one PRB (where a subcarrier spacing is $S_1$) |
| 11 | Reserved |

Alternatively, as shown in Table 5 below:

TABLE 5

| $I_0$ | $S_2$ |
|---|---|
| 00 | 15 kHz, and offset by zero PRBs (where a subcarrier spacing is $S_2$) |
| 01 | 30 kHz, and offset by zero PRBs (where a subcarrier spacing is $S_2$) |
| 10 | 30 kHz, and offset by ½ of a PRB (where a subcarrier spacing is $S_2$) |
| 11 | Reserved |

When the subcarrier spacing $S_1$ of the SS is 30 kHz, the subcarrier spacing of the RMSI is $S_2$. When the subcarrier spacing $S_2$ of the RMSI is smaller than the subcarrier spacing $S_1$ of the SS, the PRB grid of the RMSI may be obtained based on a nesting relationship shown in FIG. 11. In this case, the indication information $I_0$ may be used only to indicate a subcarrier spacing, and meanings of values of the indication information $I_0$ may be shown in Table 6 below:

TABLE 6

| $I_0$ | $S_2$ |
|---|---|
| 00 | 15 kHz |
| 01 | 30 kHz |
| 10 | Reserved |
| 11 | Reserved |

The foregoing locations may be indicated by using a frequency domain offset, as shown in Table 7 or Table 8 below. Because a quantity of PRBs offset in this case is 0 the indication information $I_0$ may be used only to indicate a subcarrier spacing.

TABLE 7

| $I_0$ | $S_2$ |
|---|---|
| 00 | 15 kHz, and offset by zero PRBs (where a subcarrier spacing is S1) |
| 01 | 30 kHz, and offset by zero PRBs (where a subcarrier spacing is S1) |
| 10 | Reserved |
| 11 | Reserved |

TABLE 8

| $I_0$ | $S_2$ |
|---|---|
| 00 | 15 kHz, and offset by zero PRBs (where a subcarrier spacing is S2) |
| 01 | 30 kHz, and offset by zero PRBs (where a subcarrier spacing is S2) |
| 10 | Reserved |
| 11 | Reserved |

The offset in the table is an offset from a boundary B1 or B2 in the PRB grid $D_1$ to the PRB grid $D_2$. A frequency domain offset direction may be predefined as offsetting from a low frequency domain location to a high frequency domain location, or may be predefined as offsetting from a high frequency domain location to a low frequency domain location, or 1 bit is used to indicate the offset direction. A unit of the offset may alternatively be a quantity of subcarriers, and one PRB corresponds to 12 subcarriers.

It can be learned that in this solution, there are two candidate subcarrier spacings of the RMSI, and the indication information $I_0$ includes two information bits, and may be used to indicate the subcarrier spacing of the RMSI, or may be used to indicate the subcarrier spacing of the RMSI and a relative location between the PRB grid $D_1$ and the PRB grid $D_2$, where the relative location may be a frequency domain offset, or a location of a preset boundary of the PRB grid $D_1$ on the PRB grid $D_2$.

Solution 5: The indication information jointly indicates the subcarrier spacing of the RMSI and the PRB grid of the RMSI.

A difference from Solution 4 is that a candidate subcarrier spacing of the RMSI is not limited. In this case, the indication information $I_0$ includes three information bits, and is used to indicate the subcarrier spacing of the RMSI and a relative location between the PRB grid $D_1$ and the PRB grid $D_2$, where the relative location may be a frequency domain offset, or a location of a preset boundary of the PRB grid $D_1$ on the PRB grid $D_2$.

For subcarrier spacings S1 of different SSs, explanations of values of the indication information $I_0$ are different. When $S_1$ is 15 kHz, meanings of the indication information $I_0$ are shown in Table 9 below:

TABLE 9

| $I_0$ | $S_2$ |
|---|---|
| 000 | 15 kHz |
| 001 | 30 kHz, where a grid boundary is a candidate location 0 |
| 010 | 30 kHz, where a grid boundary is a candidate location 1 |
| 011 | 60 kHz, where a grid boundary is a candidate location 0 |
| 100 | 60 kHz, where a grid boundary is a candidate location 1 |
| 101 | 60 kHz, where a grid boundary is a candidate location 2 |
| 110 | 60 kHz, where a grid boundary is a candidate location 3 |
| 111 | Reserved |

When $S_2$ is 30 kHz, candidate locations in the table may be shown in FIG. 25 (1), and are respectively a location 0 and a location 1. The candidate location 0 may be the location 0, and the candidate location 1 may be the location 1; or the candidate location 0 may be the location 1, and the candidate location 1 may be the location 0. When $S_2$ is 60 kHz, candidate locations in the table may be shown in FIG.

26, and are respectively locations 0 to 3. The candidate location 0 may be a location 0, the candidate location 1 may be a location 1, the candidate location 2 may be a location 2, and the candidate location 3 may be a location 3. Certainly, the candidate locations 0 to 3 may alternatively correspond to the locations 0 to 3 in FIG. 26 in another form, and this is not limited in this application.

The foregoing locations may be indicated by using a frequency domain offset, as shown in Table 10 or Table 11 below:

TABLE 10

| I0 | S2 |
|---|---|
| 000 | 15 kHz, and offset by zero PRBs (where a subcarrier spacing is S1) |
| 001 | 30 kHz, and offset by zero PRBs (where a subcarrier spacing is S1) |
| 010 | 30 kHz, and offset by one PRB (where a subcarrier spacing is S1) |
| 011 | 60 kHz, and offset by zero PRBs (where a subcarrier spacing is S1) |
| 100 | 60 kHz, and offset by one PRB (where a subcarrier spacing is S1) |
| 101 | 60 kHz, and offset by two PRBs (where a subcarrier spacing is S1) |
| 110 | 60 kHz, and offset by three PRBs (where a subcarrier spacing is S1) |
| 111 | Reserved |

TABLE 11

| I0 | S2 |
|---|---|
| 000 | 15 kHz, and offset by zero PRBs (where a subcarrier spacing is S2) |
| 001 | 30 kHz, and offset by zero PRBs (where a subcarrier spacing is S2) |
| 010 | 30 kHz, and offset by 1/2 of a PRB (where a subcarrier spacing is S2) |
| 011 | 60 kHz, and offset by zero PRBs (where a subcarrier spacing is S2) |
| 100 | 60 kHz, and offset by 1/4 of a PRB (where a subcarrier spacing is S2) |
| 101 | 60 kHz, and offset by 1/2 PRB (where a subcarrier spacing is S2) |
| 110 | 60 kHz, and offset by 3/4 of a PRB (where a subcarrier spacing is S2) |
| 111 | Reserved |

When $S_1$ is 30 kHz, meanings of the indication information $I_0$ are shown in Table 12 below:

TABLE 12

| I0 | S2 |
|---|---|
| 000 | 15 kHz |
| 001 | 30 kHz |
| 010 | 60 kHz, where a grid boundary is a candidate location 1 |
| 011 | 60 kHz, where a grid boundary is a candidate location 2 |
| 100 | Reserved |
| 101 | Reserved |
| 110 | Reserved |
| 111 | Reserved |

When $S_2$ is 60 kHz, candidate locations in the table may be shown in FIG. 25 (2), and are respectively a location 0 and a location 1. The candidate location 1 may be the location 0, and the candidate location 2 may be the location 1; or the candidate location 1 may be the location 1, and the candidate location 2 may be the location 0.

The foregoing locations may be indicated by using a frequency domain offset, as shown in Table 13 or Table 14 below:

TABLE 13

| I0 | S2 |
|---|---|
| 000 | 15 kHz, and offset by zero PRBs (where a subcarrier spacing is S1) |
| 001 | 30 kHz, and offset by zero PRBs (where a subcarrier spacing is S1) |
| 010 | 60 kHz, and offset by zero PRBs (where a subcarrier spacing is S1) |
| 011 | 60 kHz, and offset by one PRB (where a subcarrier spacing is S1) |
| 100 | Reserved |
| 101 | Reserved |
| 110 | Reserved |
| 111 | Reserved |

TABLE 14

| I0 | S2 |
|---|---|
| 000 | 15 kHz, and offset by zero PRBs (where a subcarrier spacing is S2) |
| 001 | 30 kHz, and offset by zero PRBs (where a subcarrier spacing is S2) |
| 010 | 60 kHz, and offset by zero PRBs (where a subcarrier spacing is S2) |
| 011 | 60 kHz, and offset by 1/2 of a PRB (where a subcarrier spacing is S2) |
| 100 | Reserved |
| 101 | Reserved |
| 110 | Reserved |
| 111 | Reserved |

The offset in the table is an offset from a boundary B1 or B2 in the PRB grid $D_1$ to the PRB grid $D_2$. A frequency domain offset direction may be predefined as offsetting from a low frequency domain location to a high frequency domain location, or may be predefined as offsetting from a high frequency domain location to a low frequency domain location, or 1 bit is used to indicate the offset direction. A unit of the offset may alternatively be a quantity of subcarriers, and one PRB corresponds to 12 subcarriers.

Solution 6: The subcarrier spacing of the RMSI is limited, and reuse indication information of the RMSI to indicate the PRB grid of the RMSI without adding an extra bit.

The indication information of the RMSI is used to indicate the subcarrier spacing of the RMSI. Different carrier frequency bands support limited subcarrier spacing sets. For example, in a carrier frequency band below 6 GHz, {15, 30, 60} kHz is supported, and in a carrier frequency band above 6 GHz, {120, 240} kHz is supported. Therefore, when the network device indicates the subcarrier spacing $S_2$ of the RMSI to the terminal device, a requirement can be met by using two information bits. In this solution, by limiting a candidate set of the subcarrier spacing $S_2$, the PRB grid $D_2$ corresponding to the data subcarrier spacing $S_2$ is notified to the terminal without adding a bit.

When the subcarrier spacing $S_1$ of the SS is 15 kHz, the candidate set of the subcarrier spacing $S_2$ is limited to {15, 30} kHz, and then the network device sends the indication information $I_0$ to the terminal on the PBCH, and the terminal determines, based on the indication information $I_0$ and the PRB grid $D_1$ corresponding to the subcarrier spacing $S_1$, the PRB grid $D_2$ corresponding to the subcarrier spacing $S_2$. Specific bit information of the indication information $I_0$ is shown in Table 15 below:

TABLE 15

| I0 | S2 |
|---|---|
| 00 | 15 kHz |
| 01 | 30 kHz, where a grid boundary is a candidate location 1 |
| 10 | 30 kHz, where a grid boundary is a candidate location 2 |
| 11 | Reserved |

When $S_2$ is 30 kHz, candidate locations in the table may be shown in FIG. 25 (1), and are respectively a location 0 and a location 1. The candidate location 1 may be the location 0 and the candidate location 2 may be the location 1; or the candidate location 1 may be the location 1, and the candidate location 2 may be the location 0.

The foregoing locations may be indicated by using a frequency domain offset, as shown in Table 16 or Table 17 below:

TABLE 16

| I0 | S2 |
|---|---|
| 00 | 15 kHz, and offset by zero PRBs (where a subcarrier spacing is S1) |
| 01 | 30 kHz, and offset by zero PRBs (where a subcarrier spacing is S1) |
| 10 | 30 kHz, and offset by one PRB (where a subcarrier spacing is S1) |
| 11 | Reserved |

TABLE 17

| I0 | S2 |
|---|---|
| 00 | 15 kHz, and offset by zero PRBs (where a subcarrier spacing is S2) |
| 01 | 30 kHz, and offset by zero PRBs (where a subcarrier spacing is S2) |
| 10 | 30 kHz, and offset by 1/2 of a PRB (where a subcarrier spacing is S2) |
| 11 | Reserved |

When the subcarrier spacing $S_1$ of an SS block is 30 kHz, specific bit information of the indication information $I_0$ is shown in Table 18 below:

TABLE 18

| I0 | S2 |
|---|---|
| 00 | 15 kHz |
| 01 | 30 kHz |
| 10 | 60 kHz, where a grid boundary is a candidate location 1 |
| 11 | 60 kHz, where a grid boundary is a candidate location 2 |

When S is 60 kHz, candidate locations in the table may be shown in FIG. 25 (2), and are respectively a location 0 and a location 1. The candidate location 1 may be the location 0 and the candidate location 2 may be the location 1; or the candidate location 1 may be the location 1, and the candidate location 2 may be the location 0.

The foregoing locations may be indicated by using a frequency domain offset, as shown in Table 19 or Table 20 below:

TABLE 19

| I0 | S2 |
|---|---|
| 00 | 15 kHz, and offset by zero PRBs (where a subcarrier spacing is S1) |
| 01 | 30 kHz, and offset by zero PRBs (where a subcarrier spacing is S1) |
| 10 | 60 kHz, and offset by zero PRBs (where a subcarrier spacing is S1) |
| 11 | 60 kHz, and offset by one PRB (where a subcarrier spacing is S1) |

TABLE 20

| I0 | S2 |
|---|---|
| 00 | 15 kHz, and offset by zero PRBs (where a subcarrier spacing is S2) |
| 01 | 30 kHz, and offset by zero PRBs (where a subcarrier spacing is S2) |
| 10 | 60 kHz, and offset by zero PRBs (where a subcarrier spacing is S2) |
| 11 | 60 kHz, and offset by 1/2 of a PRB (where a subcarrier spacing is S2) |

The offset in the table is an offset from a boundary B1 or B2 in the PRB grid $D_1$ (corresponding to the subcarrier spacing $S_1$) to the PRB grid $D_2$ (corresponding to the subcarrier spacing $S_2$). A frequency domain offset direction may be predefined as offsetting from a low frequency domain location to a high frequency domain location, or may be predefined as offsetting from a high frequency domain location to a low frequency domain location, or 1 bit is used to indicate the offset direction. A unit of the offset may alternatively be a quantity of subcarriers, and one PRB corresponds to 12 subcarriers.

Optionally, the network device may notify, in the RMSI or an RRC message, a PRB grid corresponding to a maximum subcarrier spacing that is supported by a carrier frequency band.

After the terminal receives the RMSI, the network device may send indication information in the RMSI or higher layer signaling, for example, an RRC message, to indicate a PRB grid corresponding to a maximum subcarrier spacing $S_3$ that is supported by at least one carrier frequency band, where the subcarrier spacing may be a subcarrier spacing used to send data and/or control information. For example, in a frequency band below 6 GHz, a PRB grid of 60 kHz is indicated, and in a frequency band above 6 GHz, no indication is needed, because in the frequency band above 6 GHz, a candidate subcarrier spacing of the SS is {120, 240} kHz, a candidate set of the subcarrier spacing used for data and/or control information is {60, 120}kHz, and the subcarrier spacing used for data and/or control information is not greater than the subcarrier spacing of the SS.

The indication information indicates a frequency domain offset between the PRB grid corresponding to the subcarrier spacing $S_3$ and a known PRB grid. The known PRB grid may be a PRB grid corresponding to the subcarrier spacing $S_1$, and the subcarrier spacing $S_1$ may be the subcarrier spacing of the SS, or may be a subcarrier spacing that is the same as the subcarrier spacing of the SS and that is used for data and/or control information transmission. Alternatively, the known PRB grid may be a PRB grid corresponding to the subcarrier spacing of the RMSI, or a PRB grid corresponding to another known subcarrier spacing. The "known" means that the network device and the terminal have a consistent understanding.

Optionally, the indication information may include two information bits. That is, two information bits may be used to indicate a PRB grid corresponding to a maximum subcarrier spacing that is supported by a carrier frequency band. For example, the known PRB grid is predefined as an PRB grid corresponding to a subcarrier spacing that is the same as the subcarrier spacing of the SS and that is used for data transmission. If the subcarrier spacing of the SS is 15 kHz, "00" indicates that the frequency domain offset is 0 "01" indicates that the frequency domain offset is ¼ of a PRB or three subcarriers, "10" indicates that the frequency domain offset is ½ of a PRB or six subcarriers, and "11" indicates that the frequency domain offset is ¾ of a PRB or nine subcarriers, where a subcarrier spacing corresponding to the PRB or the subcarriers is a maximum subcarrier spacing that is supported by a current carrier frequency band. Alternatively, "00" indicates that the frequency domain offset is 0 "01" indicates that the frequency domain offset is one PRB or 12 subcarriers, "10" indicates that the frequency domain offset is two PRBs or 24 subcarriers, and "11" indicates that the frequency domain offset is three PRBs or 36 subcarriers, where a subcarrier spacing corresponding to the PRB or the subcarriers is the subcarrier spacing of the SS.

If the subcarrier spacing of the SS is 30 kHz, "00" indicates that the frequency domain offset is 0 and "01" indicates that the frequency domain offset is half a PRB or six subcarriers, where a subcarrier spacing corresponding to the PRB or the subcarriers is a maximum subcarrier spacing that is supported by a current carrier frequency band. Alternatively, "00" indicates that the frequency domain offset is 0 and "01" indicates that the frequency domain offset is one PRB or 12 subcarriers, where a subcarrier spacing corresponding to the PRB or the subcarriers is the same as the subcarrier spacing of the SS.

A frequency domain offset direction may be predefined as that a location of a preset boundary in the PRB grid corresponding to the subcarrier spacing $S_1$ offsets from a low frequency domain location to a high frequency domain location, or may be predefined as that a location of a preset boundary in the PRB grid corresponding to the subcarrier spacing $S_1$ offsets from a high frequency domain location to a low frequency domain location, or 1 bit is used to indicate the offset direction.

In the foregoing solution, the subcarrier spacing of the SS is a subcarrier spacing of an SS block.

Optionally, the preset boundary in the foregoing solution may be a boundary that is aligned, after a center frequency of the SS block offsets by a particular quantity of subcarriers to the low frequency domain location or the high frequency domain location, with a PRB grid of data and/or control information corresponding to the subcarrier spacing of the SS block, such as B1 in FIG. 25 or B2 in FIG. 26.

Figure 15:
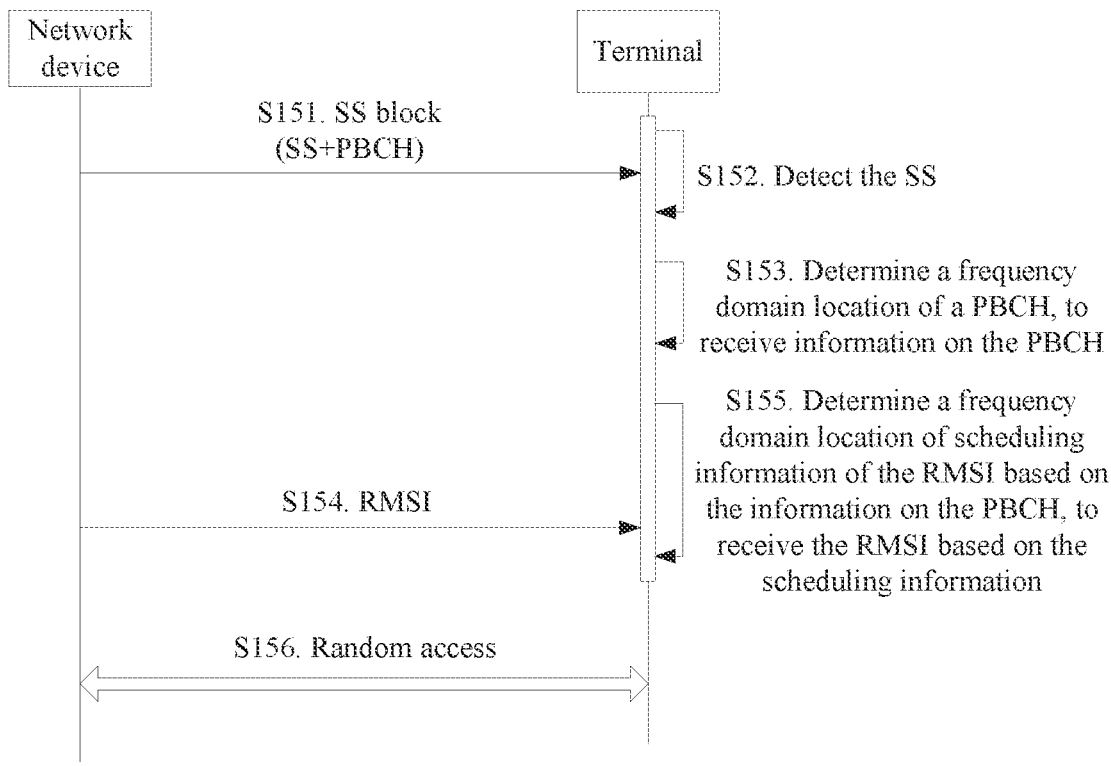
FIG. 15 is a schematic diagram of initially accessing a network by a terminal according to an embodiment of this application.

FIG. 15 is a schematic diagram of initially accessing a network by a terminal according to an embodiment of this application. As shown in FIG. 15, a process in which the terminal initially accesses the network includes the following steps.

S151. A network device sends an SS block, where the SS block includes an SS and a PBCH. In other words, the network device sends the SS and broadcasts information on the PBCH.

S152. A terminal detects the SS, and determines a frequency domain location of the PBCH based on a center frequency of the SS and a subcarrier spacing of the SS when the SS is detected. For example, 24 PRBs that center on the center frequency of the SS are frequency domain location of the PBCH, and a subcarrier spacing corresponding to the PRBs is the subcarrier spacing of the SS. In this way, the terminal can receive the information on the PBCH at the frequency domain location of the PBCH.

S154. The network device sends RMSI.

S155. The terminal receives the RMSI, where the information on the PBCH includes information about a frequency domain location for scheduling information of the RMSI, and the terminal may determine the frequency domain location for the scheduling information of the RMSI based on the information on the PBCH, to receive the scheduling information of the RMSI based on the frequency domain location. The scheduling information of the RMSI is used to indicate a frequency domain location at which the RMSI is located, and the terminal receives the RMSI based on the scheduling information of the RMSI.

The information on the PBCH includes resource information of a downlink control channel, and a resource of the downlink control channel is, for example, a control resource set (CORESET). The resource information may be frequency domain indication information, used to indicate a frequency domain location of the CORESET. For example, the resource information includes CORESET offset indication information and a size of the CORESET. The CORESET offset indication information is used to indicate a frequency domain offset of the CORESET relative to a reference point. The reference point may be a lowest, central, or highest frequency domain location of an SS (or an SS block). A value of the CORESET offset is a frequency domain offset value of a lowest, central, or highest frequency domain location of the CORESET relative to the reference point. The CORESET is used for the terminal to perform blind detection on control information, for example, information carried on a physical downlink control channel (PDCCH), where the PDCCH includes common search space, and the common search space is used to carry public information, for example, including the scheduling information of the RMSI. The terminal obtains a location of the CORESET, and then detects downlink control information based on the location of the CORESET to obtain the scheduling information of the RMSI; and learns, based on the scheduling information of the RMSI, a resource location at which the RMSI is located, to receive the RMSI. The RMSI includes resource information of random access. After the terminal receives the RMSI, a random access process (S156) may start.

In the foregoing process, if the information about the frequency domain location for the scheduling information of the RMSI in the PBCH is a quantity of offset PRBs, and the subcarrier spacing corresponding to the PRBs is the subcarrier spacing of the SS, the lowest frequency domain location, implicitly obtained in this manner, of the CORESET is aligned with a PRB grid boundary corresponding to the CORESET.

For example, in the initial access process, a subcarrier spacing of the RMSI is 30 kHz, and the subcarrier spacing of the SS is 15 kHz. When the frequency domain location of the CORESET is indicated, a 15 kHz PRB is used as a granularity to indicate that an offset value between a location of a center frequency of the CORESET and a location of the center frequency of the SS is seven PRBs, and the size of the CORESET is 10 PRBs. In this case, the terminal may consider that a lowest frequency domain location of the 10 PRBs of the CORESET is aligned with a 30 kHz PRB grid boundary.

A wideband carrier (wider BW CC, also referred to as wideband CC) concept is introduced into an NR communications system. A wideband carrier is a carrier whose carrier bandwidth (BW) is greater than or equal to preset bandwidth, and the preset bandwidth is, for example, 100 MHz. Different terminals may be allowed to access the wideband carrier by using different SSs (or SS blocks). The different SSs herein have different frequency domain locations, that is, are SSs sent at different frequency domain locations. In other words, on a wideband carrier, the network device may send a plurality of SS blocks, an SS in each SS block may allow one or more terminals to access the carrier, and different terminals may access the carrier by using SSs in different SS blocks. In this case, when different terminals determine resources of the PBCH, grids of PRBs are not aligned with each other.

Figure 16:
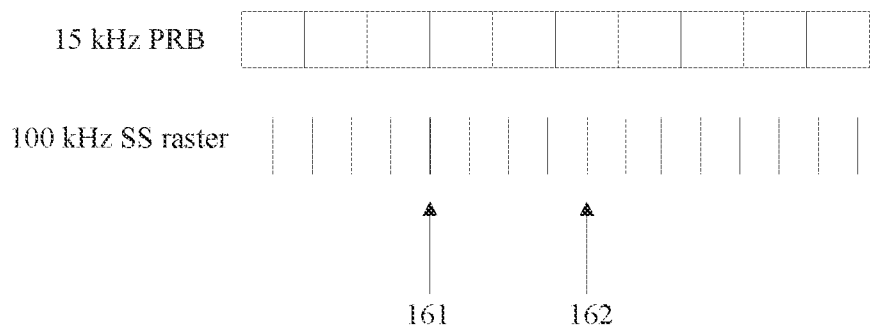
FIG. 16 is a schematic diagram of transmitting different SSs on a wideband carrier according to an embodiment of this application.

FIG. 16 is a schematic diagram of transmitting different SSs on a wideband carrier according to an embodiment of this application. It is assumed that a first SS is sent at a location 161, a second SS is sent at a location 162, and the location 162 is not aligned with a boundary of a PRB grid. Therefore, an understanding of a PRB grid by a terminal that detects an SS at the location 162 is inconsistent with an understanding of a PRB grid by a terminal that detects an SS at the location 161. Therefore, it cannot be ensured that all terminals that are about to access a carrier through different SSs can access the carrier. For example, the terminal that detects the SS at the location 162 cannot accurately determine a resource location of a PBCH, and accordingly cannot access the carrier. A case shown in FIG. 17 is used as an example for description.

Figure 17:
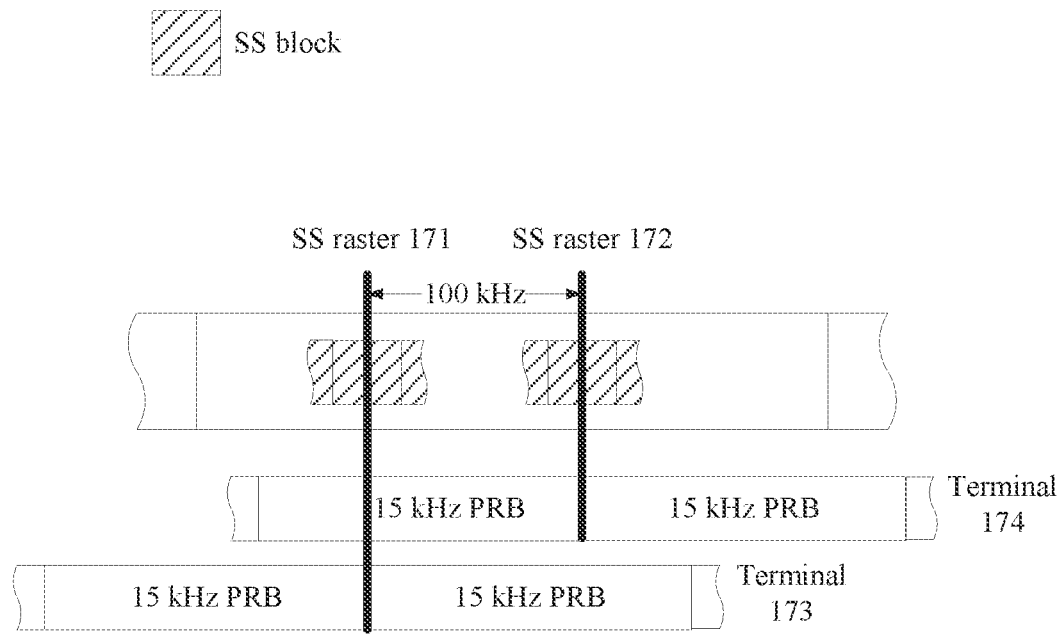
FIG. 17 is a schematic diagram of accessing a same carrier by different terminals by using different SSs according to an embodiment of this application.

FIG. 17 is a schematic diagram of accessing a same carrier by different terminals by using different SSs according to an embodiment of this application. In FIG. 17, a description is provided by using an example in which a size of an SS raster is 100 kHz and a subcarrier spacing of a PRB is 15 kHz. A network device sends a first SS at a location 171 of the SS raster in FIG. 17, and sends a second SS at a location 172 of the SS raster in FIG. 17. A terminal 173 and a terminal 174 detect the SSs based on the SS raster. The terminal 173 detects the first SS at the location 171 of the SS raster, and determines a PRB grid based on a center frequency of the first SS, so as to determine a resource location of a PBCH. The terminal 174 detects the second SS at the location 172 of the SS raster, and determines a PRB grid based on a center frequency of the second SS, so as to determine a resource location of the PBCH. However, if the PRB grid determined at the location 171 of the SS raster is used as a reference, for the terminal 174, there may be a case of PRB grid misalignment. As shown in FIG. 17, PRB grid boundaries determined by the terminal 173 and the terminal 174 are not aligned with each other. It can be learned that the terminal 173 and the terminal 174 have inconsistent understandings of the PRB grid. Therefore, there needs to be a terminal and a network device that have inconsistent understandings of the PRB grid. For example, if the terminal is the terminal 174, the terminal 174 cannot correctly determine a resource location of the PBCH; therefore the terminal 174 cannot correctly receive a MIB and consequently cannot access the carrier.

In consideration of the foregoing problem, an embodiment of this application provides a communication method, so that a frequency offset between center frequencies of different SSs is a positive integral multiple of a least common multiple of a size of an SS raster and a size of a PRB. In this way, when determining a PRB grid based on a center frequency of an SS, terminals to access a same carrier by using different SSs have a consistent understanding of the PRB grid, and can correctly receive a MIB, so as to access the carrier. The following is described with reference to the accompanying drawings.

Figure 18:
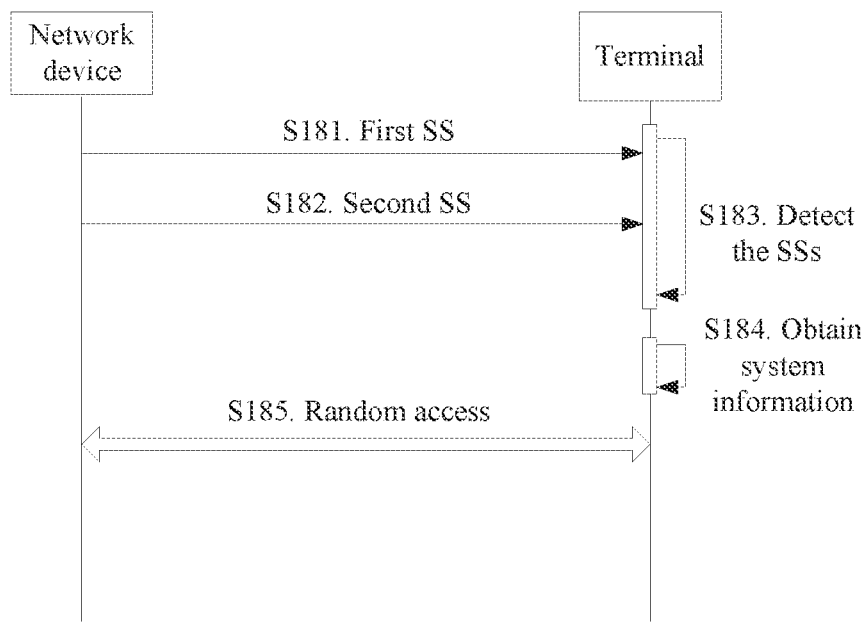
FIG. 18 is a schematic diagram of still another communication method according to an embodiment of this application.

FIG. 18 is a schematic diagram of a communication method according to an embodiment of this application. The method is used to resolve the following problem: To access a same carrier by using different SSs, different terminals have inconsistent understandings of a PRB grid, and consequently some terminals cannot access the carrier. As shown in FIG. 18, the method includes the following steps.

S181. A network device sends a first SS on a carrier, where a center frequency of the first SS is located at a first location of an SS raster.

S182. When there is a second SS to be sent, the network device sends the second SS on the carrier, where a center frequency of the second SS is located at a second location of the SS raster.

When the network device sends SSs on a same carrier, a same subcarrier spacing is used. In other words, the first SS and the second SS are sent by using the same subcarrier spacing. In addition, a frequency offset between the second location and the first location is a positive integral multiple of a least common multiple of a size of the SS raster and a size of a PRB, where the size of the PRB is a product of the subcarrier spacing (collectively referred to as a subcarrier spacing of an SS) used to send the first SS and the second SS and a quantity of subcarriers included in the PRB. In other words, when the second SS needs to be sent, the network device does not directly send the second SS at a next location of the SS raster, or does not send the second SS by randomly selecting a location of the SS raster, but sends the second SS at the second location, where the frequency offset between the second location and the first location meets a preset condition. The preset condition is related to the size of the SS raster and the subcarrier spacing of the SS. That is, the frequency offset between the second location and the first location is a positive integral multiple of a least common multiple of the size of the SS raster and the size of the PRB, where the size of the PRB is related to the subcarrier spacing.

S183. A terminal detects an SS based on the SS raster.

When the SS is detected, the terminal achieves downlink synchronization with a cell based on the SS, so as to obtain system information (S184); and then initiates random access based on the system information, so as to start a random access process (S185).

In the foregoing step S181, the network device sends a first SS block, where the first SS block includes the first SS and a first PBCH, and the first SS includes a PSS and an SSS. In other words, the network device sends the first SS and broadcasts information on the first PBCH. In frequency domain, the center frequency of the first SS and a center frequency of the first PBCH are located at the first location of the SS raster. In time domain, the network device may periodically send the first SS at the first location and broadcast the information on the first PBCH.

In the foregoing step S182, the network device sends a second SS block, where the second SS block includes the second SS and a second PBCH, and the second SS includes a PSS and an SSS. In other words, the network device sends the second SS and broadcasts information on the second PBCH. The PSS/SSS of the first SS and the PSS/SSS of the second SS may be a same SS sequence, but have different frequency domain locations. In frequency domain, the center frequency of the second SS and a center frequency of the second PBCH are located at the second location of the SS raster. In time domain, the network device may periodically send the second SS at the second location and broadcast the information on the second PBCH.

When there are a plurality of SSs on a carrier for terminals to access the carrier, to enable PRB grids determined by different terminals based on different SSs to be aligned with each other, that is, to enable the terminals to have a consistent understanding of the PRB grids, in the foregoing embodiment, a frequency offset between center frequencies of different SSs (namely, the frequency offset between the second location and the first location) is limited to a positive integral multiple of a least common multiple of a size of an SS raster and a size of a PRB. The following is described by using examples of different sizes of the SS raster and different sizes of the subcarrier spacing.

Figure 19:
FIG. 19 is a schematic diagram of accessing a same carrier by different terminals by using different SSs according to an embodiment of this application.
Figure 19:
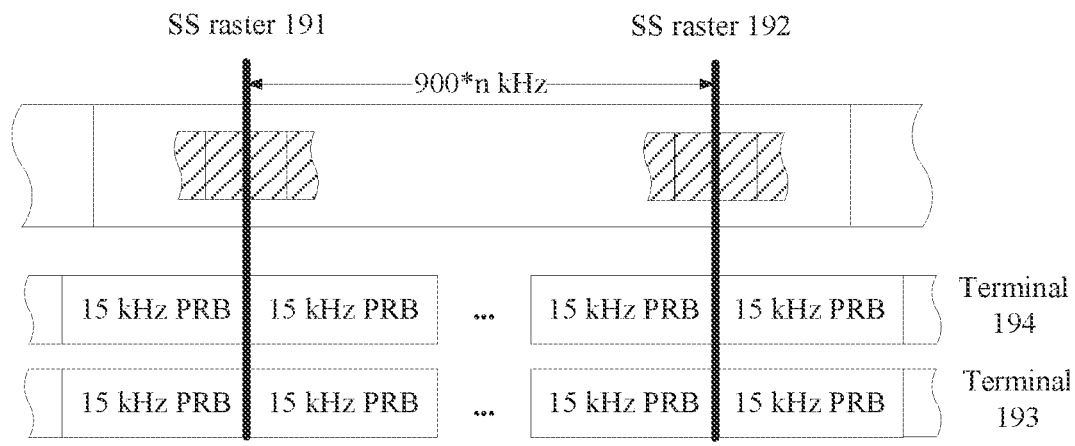

FIG. 19 is a schematic diagram of accessing a same carrier by different terminals by using different SSs according to an embodiment of this application. Assuming that a size of an SS raster is 100 kHz and a subcarrier spacing of an SS is 15 kHz, a size of a PRB is 15*12 kHz, namely, 180 kHz. A least common multiple of 100 and 180 is 900, and a frequency offset between center frequencies (or locations of an SS raster at which SSs are located) of different SSs in a carrier is 900*n kHz, where n is a positive integer. In this case, a terminal 193 that detects an SS from a first location 191 of the SS raster and a terminal 194 that detects an SS from a second location 192 of the SS raster have a consistent understanding of PRB grids. Therefore, the terminal 93 and the terminal 194 both can correctly receive a MIB, so as to access the carrier.

Assuming that a size of an SS raster is 100 kHz and a subcarrier spacing of an SS is 30 kHz, a size of a PRB is 30*12 kHz, namely, 360 kHz. A least common multiple of 100 and 180 is 1800, and a frequency offset between center frequencies (or locations of an SS raster at which SSs are located) of different SSs in a carrier is 1800*n kHz, where n is a positive integer.

Assuming that a size of an SS raster is 180 kHz and a subcarrier spacing of an SS is 15 kHz, a size of a PRB is 15*12 kHz, namely, 180 kHz. A frequency offset between center frequencies (or locations of an SS raster at which SSs are located) of different SSs in a carrier is 180*n kHz, where n is a positive integer. In this case, the size of the PRB is the same as the size of the SS raster. Therefore, a least common multiple is 180 kHz. It may also be understood that there is no need to limit the frequency offset between the center frequencies of different SSs, and the network device can send the SS at any two locations of the SS raster. When a size of an SS raster is 180 kHz, assuming that a subcarrier spacing of an SS is 30 kHz, a size of a PRB is 30*12 kHz, namely, 360 kHz. A least common multiple of 180 and 360 is 360, and a frequency offset between center frequencies (or locations of an SS raster at which SSs are located) of different SSs in a carrier is 360*n kHz, where n is a positive integer.

Assuming that a size of an SS raster is 720 kHz and a subcarrier spacing of an SS is 120 kHz, a size of a PRB is 120*12 kHz, namely, 1440 kHz. A least common multiple of 720 and 1440 is 1440, and a frequency offset between center frequencies (or locations of an SS raster at which SSs are located) of different SSs in a carrier is 1440*n kHz, where n is a positive integer. When a size of an SS raster is 720 kHz, assuming that a subcarrier spacing of an SS is 240 kHz, a size of a PRB is 240*12 kHz, namely, 2880 kHz. A least common multiple of 720 and 2880 is 2880, and a frequency offset between center frequencies (or locations of an SS raster at which SSs are located) of different SSs in a carrier is 2880*n kHz, where n is a positive integer.

The foregoing gives a plurality of examples of sizes of the SS raster and sizes of the subcarrier spacing, and describes conditions to be met by a frequency offset between center frequencies of different SSs in a case of corresponding sizes. These examples are merely for ease of understanding this embodiment and are not intended to limit this application. A person skilled in the art may implement, based on the foregoing embodiment, SS sending with various combinations of the SS raster and the subcarrier spacing.

In the foregoing step S183, some terminals may detect an SS at the first location, and some terminals may detect an SS at the second location. It is assumed that a terminal that detects an SS at the first location is a first terminal, where there may be one or more first terminals; and it is assumed that a terminal that detects an SS at the second location is a second terminal, where there may be one or more second terminals.

In the foregoing step S184, the system information obtained by the terminal may include a MIB and RMSI. When the terminal is the first terminal, the first terminal detects the first SS at the first location of the SS raster, and determines a resource location of the first PBCH based on the first SS, for example, 24 PRBs that center on the center frequency of the first SS; and then receives, on the first PBCH, a first MIB sent by the network device. When the terminal is the second terminal, the second terminal detects the second SS at the second location of the SS raster, and determines a resource location of the second PBCH based on the second SS, for example, 24 PRBs that center on the center frequency of the second SS; and then receives, on the second PBCH, a second MIB sent by the network device.

Any one of the foregoing MIBs may include resource information, where the resource information is used to indicate a resource location of a control channel at which RMSI scheduling information is located. After the terminal correctly parses a MIB, the terminal receives, based on resource information in the MIB, RMSI scheduling information sent by the network device, then receives RMSI based on the RMSI scheduling information, and initiates random access based on the RMSI, so as to access the carrier.

In an implementation, resource information of a downlink control channel is carried on a PBCH, and a resource of the downlink control channel is, for example, a control resource set (CORESET). The resource information may be frequency domain indication information, used to indicate a frequency domain location of the CORESET. Optionally, the resource information includes a CORESET offset value and a size of the CORESET. The CORESET offset value is used to indicate a frequency offset of the CORESET relative to a reference point. The reference point may be a lowest, central, or highest frequency domain location of an SS (or an SS block). The CORESET offset value is a frequency offset of a lowest, central, or highest frequency domain location of the CORESET relative to the reference point. The CORESET is used for the terminal to perform blind detection on control information, for example, information carried on a physical downlink control channel (PDCCH), where the PDCCH includes common search space, and the common search space is used to carry public information, for example, including the scheduling information of the RMSI. The terminal obtains a location of the CORESET based on the MIB, and then detects downlink control information based on the location of the CORESET to obtain the scheduling information of the RMSI; and learns of, based on the scheduling information of the RMSI, a resource location at which the RMSI is located, to receive the RMSI. After the terminal receives the RMSI, a random access process may start.

For example, the first terminal determines, based on first resource information in the first MIB, a resource location of a control channel at which first RMSI scheduling information is located. Then the first terminal receives the first RMSI scheduling information on the control channel, determines a resource location at which first RMSI is located based on the first RMSI scheduling information, and receives the first RMSI at the determined resource location. Likewise, the second terminal determines, based on second resource information in the second MIB, a resource location of a control channel at which second RMSI scheduling information is located. Then the second terminal receives the second RMSI scheduling information on the control channel, determines a resource location at which second RMSI is located based on the second RMSI scheduling information, and receives the second RMSI at the determined resource location.

It can be learned that when a terminal accesses a carrier, first an SS is blindly detected, a frequency domain location of a PBCH is determined based on the detected SS, and then a MIB carried on the PBCH is received at the determined frequency domain location. The MIB includes information about a CORESET that is used to transmit downlink control information. The terminal determines a frequency domain location of the CORESET based on the information, and then receives control information carried on the PDCCH at the determined frequency domain location. The control information includes scheduling information of RMSI, and the terminal determines a frequency domain location, of the RMSI, on a physical downlink shared channel (PDSCH) based on the scheduling information of the RMSI. Further, the terminal can receive the RMSI at the determined frequency domain location. The RMSI may carry random access information, and the terminal may initiate random access based on the RMSI.

In the foregoing embodiments, the size of the SS raster and the subcarrier spacing of the SS determine the frequency offset between the center frequencies of different SSs; or, in other words, the size of the SS raster and the subcarrier spacing of the SS determine a frequency offset between locations of an SS raster at which different SSs are sent. In another implementation provided in this embodiment of this application, the size of the SS raster and the subcarrier spacing of the SS are determined according to a carrier frequency, and the size of the SS raster is a positive integral multiple of a size of a PRB corresponding to the subcarrier spacing of the SS. In this way, regardless of the SS raster locations at which different SSs are sent, terminals that detect the different SSs have a consistent understanding of a PRB grid. Therefore, terminals to access a same carrier by using the different SSs can correctly receive system information and access the carrier without using the foregoing frequency domain location restriction manner.

Figure 20:
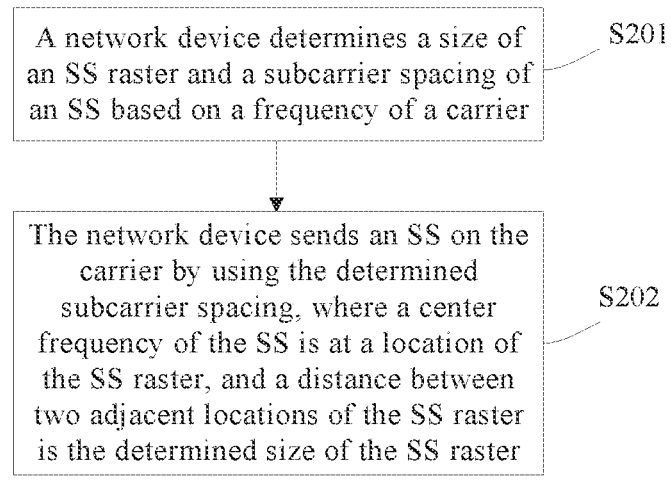
FIG. 20 is a schematic diagram of another communication method according to an embodiment of this application.

FIG. 20 is a schematic diagram of another communication method according to an embodiment of this application. The method is used to resolve the following problem: To access a same carrier by using different SSs, different terminals have inconsistent understandings of a PRB grid, and consequently some terminals cannot access the carrier. As shown in FIG. 20, the method includes the following steps:

S201. A network device determines a size of an SS raster and a subcarrier spacing of an SS based on a frequency of a carrier.

S202. The network device sends an SS on the carrier by using the determined subcarrier spacing, where a center frequency of the SS is at a location of the SS raster, and a distance between two adjacent locations of the SS raster is the determined size of the SS raster.

Figure 21:
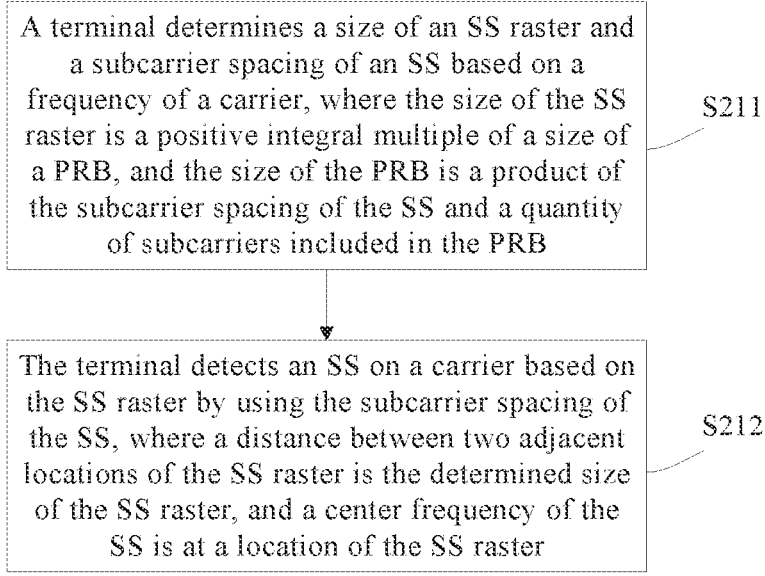
FIG. 21 is a schematic diagram of another communication method according to an embodiment of this application.

Correspondingly, FIG. 21 is a schematic diagram of another communication method according to an embodiment of this application. The method is used to resolve the following problem: To access a same carrier by using different SSs, different terminals have inconsistent understandings of a PRB grid, and consequently some terminals cannot access the carrier. As shown in FIG. 21, the method includes the following steps:

S211. A terminal determines a size of an SS raster and a subcarrier spacing of an SS based on a frequency of a carrier, where the size of the SS raster is a positive integral multiple of a size of a PRB, and the size of the PRB is a product of the subcarrier spacing of the SS and a quantity of subcarriers included in the PRB.

S212. The terminal detects an SS on the carrier based on the SS raster by using the subcarrier spacing of the SS, where a distance between two adjacent locations of the SS raster is the determined size of the SS raster, and a center frequency of the SS is at a location of the SS raster.

Optionally, in the foregoing embodiment, the size of the SS raster is equal to the size of the PRB corresponding to the subcarrier spacing of the SS. For example, Table 2 below shows sizes of the subcarrier spacing of the SS and sizes of the SS raster at several carrier frequencies. Regardless of SS raster locations at which different SSs are sent, terminals that detect the different SSs have a consistent understanding of a PRB grid. Therefore, terminals to access a same carrier by using the different SSs can correctly receive system information and access the carrier without using the foregoing frequency domain location restriction manner.

TABLE 2

| Carrier frequency f | Subcarrier spacing of an SS | SS raster |
| --- | --- | --- |
| f < 3 GHz | 15 kHz | 180 kHz |
| 3 GHz < f < 6 GHz | 30 kHz | 360 kHz |

The embodiments shown in FIG. 18, FIG. 20, and FIG. 21 may be combined with the foregoing embodiment. To be specific, when sending of different SSs is supported on a carrier, the foregoing method may be used, so that terminals to access the carrier by using different SSs can have a consistent understanding of a PRB grid. In addition, by using the method in the foregoing embodiment, a terminal can correctly obtain a PRB grid used to perform data/control information transmission, so as to correctly perform data/control information transmission and reception.

An embodiment of this application further provides an apparatus configured to implement any one of the foregoing methods, for example, provides an apparatus that includes units (or means) configured to implement the steps performed by the terminal in any one of the foregoing methods; and for another example, further provides another apparatus that includes units (or means) configured to implement the steps performed by the network device in any one of the foregoing methods.

It should be understood that the division of the units in the apparatus is merely division of logical functions. During actual implementation, all or some of the units may be integrated into a physical entity, or may be physically separated. In addition, all the units in the apparatus may be implemented in a form of software invoked by a processing element, or may be implemented by hardware; or some units may be implemented in a form of software invoked by a processing element, and some units may be implemented by hardware. For example, during implementation, a unit may be a separately disposed processing element, or may be integrated into a chip of the apparatus. Alternatively, the unit may be stored in a form of a program in a memory and invoked by a processing element of the apparatus to perform a function of the unit. Implementation of other units is similar thereto. In addition, all or some of these units may be integrated or separately implemented. The processing element herein may be an integrated circuit having a signal processing capability. During an implementation process, the steps of the foregoing methods or the foregoing units may be completed by using a hardware-integrated logic circuit in a processor element or instructions in a form of software.

For example, the units in the apparatus may be configured as one or more integrated circuits for implementing the foregoing methods, for example, one or more application-specific integrated circuits (ASIC), one or more digital signal processors (DSP), one or more field programmable gate arrays (FPGA), or the like. For another example, when the units in the apparatus may be implemented in a form of scheduling a program by a processing element, the processing element may be a general purpose processor, for example, a central processing unit (CPU) or another processor that can invoke a program. For another example, these units may be integrated together, and implemented in a system-on-a-chip (SOC) form.

Figure 22:
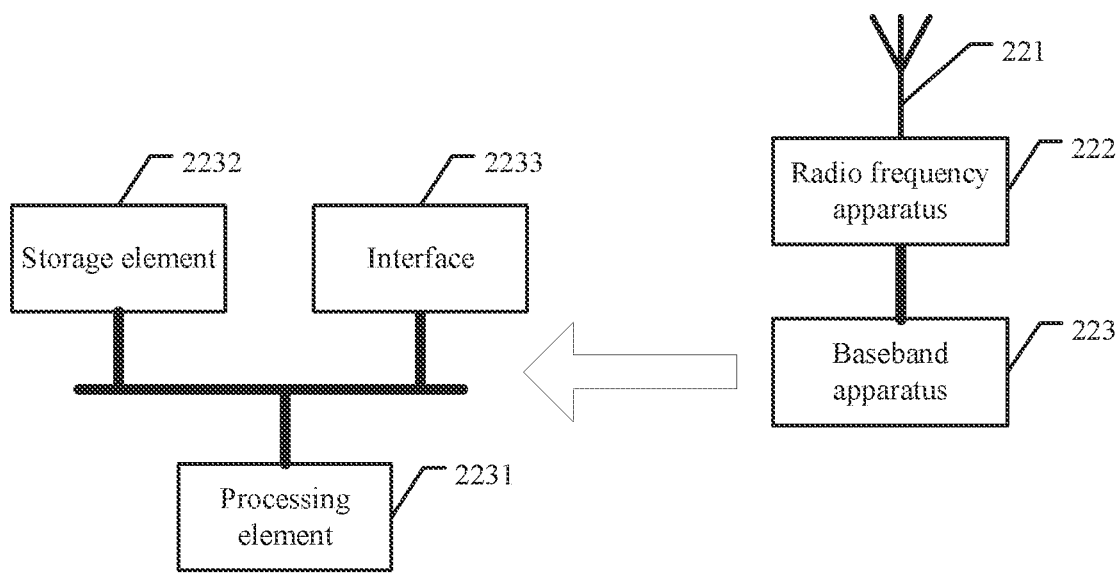
FIG. 22 is a schematic structural diagram of a network device according to an embodiment of this application.

FIG. 22 is a schematic structural diagram of a network device according to an embodiment of this application, to implement operations of the network device in the foregoing embodiments. As shown in FIG. 22, the network device includes: an antenna 221, a radio frequency apparatus 222, and a baseband apparatus 223. The antenna 221 is connected to the radio frequency apparatus 221. In an uplink direction, the radio frequency apparatus 222 receives, through the antenna 221, information sent by a terminal, and sends the information sent by the terminal to the baseband apparatus 223 for processing. In a downlink direction, the baseband apparatus 223 processes information for the terminal, and sends the information for the terminal to the radio frequency apparatus 222, and the radio frequency apparatus 222 processes the information for the terminal, and then sends the processed information to the terminal through the antenna 221.

The foregoing apparatus applied to the network device may be located in the baseband apparatus 223. In an implementation, the units through which the network device implements the steps in the foregoing methods may be implemented in a form of scheduling a program by a processing element. For example, the baseband apparatus 223 includes a processing element 2231 and a storage element 2232. The processing element 2231 invokes a program stored in the storage element 2232, to perform the methods performed by the network device in the foregoing method embodiments. In addition, the baseband apparatus 223 may further include an interface 2233, configured to exchange information with the radio frequency apparatus 222. The interface is, for example, a common public radio interface (CPRI).

In another implementation, the units through which the network device implements the steps in the foregoing methods may be configured as one or more processing elements. These processing elements are disposed on the baseband apparatus 223. The processing elements herein may be an integrated circuit, for example, one or more ASICs, one or more DSPs, one or more FPGAs, or the like. These integrated circuits may be integrated to form a chip.

These units may be integrated together, and implemented in a system-on-a-chip (SOC) form. For example, the baseband apparatus 223 includes an SOC chip, configured to implement the foregoing methods. The chip may be integrated with the processing element 2231 and the storage element 2232, and the processing element 2231 invokes the program stored in the storage element 2232 to implement the foregoing methods performed by the network device; or the chip may be integrated with at least one integrated circuit, to implement the foregoing methods performed by the network device; or the foregoing implementations may be combined, where functions of some units are implemented by the processing element by invoking a program, and functions of some units are implemented by an integrated circuit.

Regardless of a used manner, the foregoing apparatus applied to the network device includes at least one processing element and a storage element, where the at least one processing element is configured to perform the methods that are performed by the network device and that are provided in the foregoing method embodiments. The processing element may perform, in a first manner, that is, by invoking a program stored in the storage element, some or all of the steps performed by the network device in the foregoing method embodiments; or may perform, in a second manner, that is, by using a hardware-integrated logic circuit in a processor element and instructions, some or all of the steps performed by the network device in the foregoing method embodiments; or certainly, may perform, by combining the first manner and the second manner, some or all of the steps performed by the network device in the foregoing method embodiments.

The processing element herein is the same as that in the foregoing description, and may be a general purpose processor, for example, a central processing unit (CPU), or may be configured as one or more integrated circuits for implementing the foregoing methods, for example, one or more application-specific integrated circuits (ASIC), one or more digital signal processors (DSP), one or more field programmable gate arrays (FPGA), or the like.

The storage element may be a memory, or may be a collective name for a plurality of storage elements.

Figure 23:
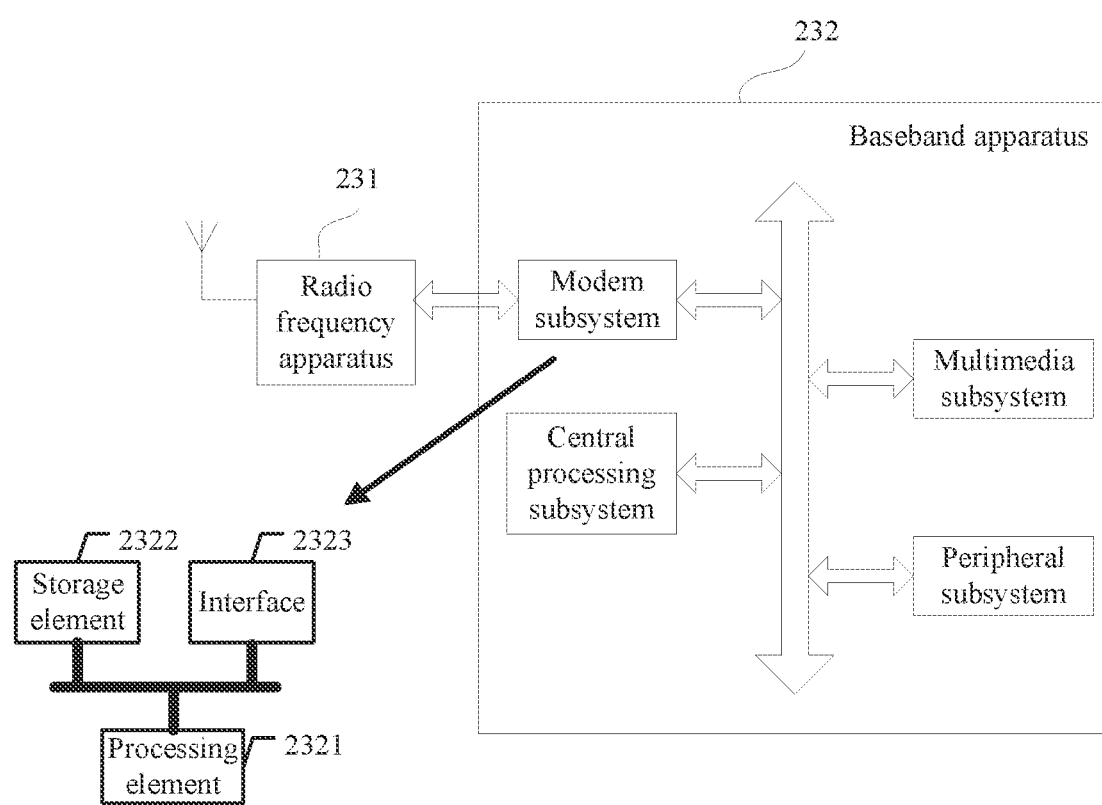
FIG. 23 is a schematic structural diagram of a terminal according to an embodiment of this application.

FIG. 23 is a schematic structural diagram of a terminal according to an embodiment of this application. The terminal may be the terminal in the foregoing embodiments, configured to implement operations of the terminal in the foregoing embodiments. As shown in FIG. 23, the terminal includes: an antenna, a radio frequency apparatus 231, and a baseband apparatus 232. The antenna is connected to the radio frequency apparatus 231. In a downlink direction, the radio frequency apparatus 231 receives, through the antenna, information sent by a network device, and sends the information sent by the network device to the baseband apparatus 232 for processing. In an uplink direction, the baseband apparatus 232 processes information from the terminal, and sends the information from the terminal to the radio frequency apparatus 231, and the radio frequency apparatus 231 processes the information from the terminal, and then sends the processed information to the network device through the antenna.

The baseband apparatus may include a modem subsystem, configured to process data at various communications protocol layers; may further include a central processing subsystem, configured to process a terminal operating system and an application layer; and may further include other subsystems, such as a multimedia subsystem and a peripheral subsystem, where the multimedia subsystem is configured to control a camera, screen display, and the like of the terminal, and the peripheral subsystem is configured to implement connection with another device. The modem subsystem may be a separately disposed chip. Optionally, a processing apparatus of the foregoing frequency domain resource may be implemented on the modem subsystem.

In an implementation, the units through which the terminal implements the steps in the foregoing methods may be implemented in a form of scheduling a program by a processing element. For example, a subsystem of the baseband apparatus 232, such as a modem subsystem, includes a processing element 2321 and a storage element 2322. The processing element 2321 invokes a program stored in the storage element 2322, to perform the methods performed by the terminal in the foregoing method embodiments. In addition, the baseband apparatus 232 may further include an interface 2323, configured to exchange information with the radio frequency apparatus 231.

In another implementation, the units through which the terminal implements the steps in the foregoing methods may be configured as one or more processing elements. These processing elements are disposed on a particular subsystem of the baseband apparatus 232, for example, a modem subsystem. The processing elements herein may be an integrated circuit, for example, one or more ASICs, one or more DSPs, one or more FPGAs, or the like. These integrated circuits may be integrated to form a chip.

For example, the units through which the terminal implements the steps in the foregoing methods may be integrated together, and implemented in a system-on-a-chip (SOC) form. For example, the baseband apparatus 232 includes an SOC chip, configured to implement the foregoing methods. The chip may be integrated with the processing element 2321 and the storage element 2322, and the processing element 2321 invokes the program stored in the storage element 2322 to implement the foregoing methods performed by the terminal; or the chip may be integrated with at least one integrated circuit, to implement the foregoing methods performed by the terminal; or the foregoing implementations may be combined, where functions of some units are implemented by the processing element by invoking a program, and functions of some units are implemented by an integrated circuit.

Regardless of a used manner, the foregoing apparatus applied to the terminal includes at least one processing element and a storage element, where the at least one processing element is configured to perform the methods that are performed by the terminal and that are provided in the foregoing method embodiments. The processing element may perform, in a first manner, that is, by scheduling a program stored in the storage element, some or all of the steps performed by the terminal in the foregoing method embodiments; or may perform, in a second manner, that is, by using a hardware-integrated logic circuit in a processor element and instructions, some or all of the steps performed by the terminal in the foregoing method embodiments; or certainly, may perform, by combining the first manner and the second manner, some or all of the steps performed by the terminal in the foregoing method embodiments.

The processing element herein is the same as that in the foregoing description, and may be a general purpose processor, for example, a central processing unit (CPU), or may be configured as one or more integrated circuits for implementing the foregoing methods, for example, one or more application-specific integrated circuits (ASIC), one or more digital signal processors (DSP), one or more field programmable gate arrays (FPGA), or the like.

The storage element may be a memory, or may be a collective name for a plurality of storage elements.

A person of ordinary skill in the art may understand that all or some of the steps in the method embodiments may be implemented by a program instructing related hardware. The program may be stored in a computer readable storage medium. When the program runs, the steps in the method embodiments are performed. The foregoing storage medium includes: any medium that can store program code, such as a ROM, a RAM, a magnetic disk, or an optical disc.

What is claimed is:

1. An apparatus comprising:
   at least one processor, coupled to a non-transitory memory having a computer program stored thereon, wherein the processor is configured to execute instructions of the computer program, execution of the instructions enabling the apparatus to:
   send a synchronization signal to a terminal based on a synchronization signal raster, wherein a position of the synchronization signal raster is determined based on a frequency band in which a carrier is located, and a first resource position is used for the synchronization signal;
   send first indication information to the terminal, wherein the first indication information indicates a first frequency offset between the first resource position and a second resource position;
   send second indication information to the terminal, wherein the second indication information indicates a second frequency offset between the second resource position and a third resource position; and
   communicate with the terminal based on the third resource position.

2. The apparatus according to claim 1, wherein execution of the instructions further enables the apparatus to:
   send the first indication information through a physical broadcast channel (PBCH).

3. The apparatus according to claim 1, wherein execution of the instructions further enables the apparatus to:
   send remaining minimum system information (RMSI), wherein the RMSI carries the second indication information.

4. A method, performed by an apparatus, the method comprising:
   detecting, based on a synchronization signal raster, a synchronization signal from a network device, wherein a position of the synchronization signal raster is determined based on a frequency band in which a carrier is located, and a first resource position is used for the synchronization signal;
   receiving first indication information from the network device, wherein the first indication information indicates a first frequency offset between the first resource position and a second resource position;
   receiving second indication information from the network device, wherein the second indication information indicates a second frequency offset between the second resource position and a third resource position; and
   communicating with the network device using a resource on the carrier based on the third resource position.

5. The method according to claim 4, further comprising:
   determining the first resource position based on the synchronization signal.

6. The method according to claim 4, wherein receiving the first indication information comprises:
    receiving the first indication information through a physical broadcast channel (PBCH).

7. The method according to claim 4, wherein receiving the second indication information comprises:
    receiving remaining minimum system information (RMSI), wherein the RMSI carries the second indication information.

8. An apparatus, comprising:
    at least one processor, coupled to a non-transitory memory having a computer program stored thereon, wherein the processor is configured to execute instructions of the computer program, execution of the instructions enabling the apparatus to:
        detect a synchronization signal from a network device based on a synchronization signal raster, wherein a position of the synchronization signal raster is determined based on a frequency band in which a carrier is located, and a first resource position is used for the synchronization signal;
        receive first indication information from the network device, wherein the first indication information indicates a first frequency offset between the first resource position and a second resource position;
        receive second indication information from the network device, wherein the second indication information indicates a second frequency offset between the second resource position and a third resource position; and
        communicate with the network device using a resource on the carrier based on the third resource position.

9. The apparatus according to claim 8, wherein execution of the instructions further enables the apparatus to:
    determine the first resource position based on the synchronization signal.

10. The apparatus according to claim 8, wherein the first indication information is received through a physical broadcast channel (PBCH).

11. The apparatus according to claim 8, wherein the second indication information is received through remaining minimum system information (RMSI).

* * * * *

UNITED STATES PATENT AND TRADEMARK OFFICE
CERTIFICATE OF CORRECTION

| | |
|---|---|
| PATENT NO. | : 12,101,217 B2 |
| APPLICATION NO. | : 17/351941 |
| DATED | : September 24, 2024 |
| INVENTOR(S) | : Li et al. |

It is certified that error appears in the above-identified patent and that said Letters Patent is hereby corrected as shown below:

In the Specification

In Column 11, Line 13, delete "|360*n-180*ml" and insert -- |360*n-180*m| --.

In Column 12, Line 19, delete "0 In" and insert -- 0. In --.

In Column 14, in "Table 1", under "Indication Information", Line 2, delete "is o" and insert -- is 0 --.

In Column 15, in "Table 1", under "Indication Information", Line 2, delete "is o," and insert -- is 0, --.

In Column 15, in "Table 1", under "Indication Information", Line 12, delete "is o," and insert -- is 0, --.

In Column 15, in "Table 1", under "Indication Information", Line 16, delete "is o," and insert -- is 0, --.

In Column 19, Line 13, delete "14." and insert -- $I_4$. --.

In Column 19, Line 40, delete "is 0" and insert -- is 0, --.

In Column 20, Line 63, delete "$I_0$" and insert -- $I_0$, --.

In Column 21, Line 39, delete "$I_0$" and insert -- $I_0$. --.

In Column 21, Line 44, after "is" delete "0" and insert -- 0, --.

In Column 21, Line 49, after "is" delete "0" and insert -- 0, --.

In Column 22, Line 15, delete "$I_0$" and insert -- $I_0$, --.

Signed and Sealed this
Twelfth Day of November, 2024

Katherine Kelly Vidal
*Director of the United States Patent and Trademark Office*

CERTIFICATE OF CORRECTION (continued)
U.S. Pat. No. 12,101,217 B2

In Column 23, Line 51, delete "I$_0$" and insert -- I$_0$, --.

In Column 24, Line 13, delete "is 0" and insert -- is 0, --.

In Column 24, Line 18, delete "is 0" and insert -- is 0, --.

In Column 24, Line 31, delete "I$_0$" and insert -- I$_0$, --.

In Column 24, Line 67, after "location" delete "0" and insert -- 0, --.

In Column 25, Line 54, delete "is 0" and insert -- is 0, --.

In Column 29, Line 15, delete "0 and" and insert -- 0, and --.

In Column 29, Line 58, delete "S is" and insert -- S$_2$ is --.

In Column 29, Line 60, after "the location" delete "0" and insert -- 0, --.

In Column 31, Line 9, delete "is 0" and insert -- is 0, --.

In Column 31, Line 17, delete "is 0" and insert -- is 0, --.

In Column 31, Line 25, delete "is 0" and insert -- is 0, --.

In Column 31, Line 31, delete "0 and" and insert -- 0, and --.